US 8,156,533 B2

(12) United States Patent
Crichton

(10) Patent No.: US 8,156,533 B2
(45) Date of Patent: Apr. 10, 2012

(54) MEDIA TRANSMISSION SYSTEM AND METHOD

(75) Inventor: Daniel Crichton, Cambridge (GB)

(73) Assignee: Accenture Global Services Limited, Dublin (IE)

( * ) Notice: Subject to any disclaimer, the term of this patent is extended or adjusted under 35 U.S.C. 154(b) by 986 days.

(21) Appl. No.: 10/503,418

(22) PCT Filed: Feb. 4, 2003

(86) PCT No.: PCT/GB03/00489
§ 371 (c)(1),
(2), (4) Date: Dec. 30, 2004

(87) PCT Pub. No.: WO03/067845
PCT Pub. Date: Aug. 14, 2003

(65) Prior Publication Data
US 2005/0155075 A1    Jul. 14, 2005

(30) Foreign Application Priority Data
Feb. 4, 2002 (EP) ...................... 0229053

(51) Int. Cl.
*H04N 7/173* (2006.01)
(52) U.S. Cl. ............................ 725/120; 725/95; 725/127
(58) Field of Classification Search .................. 725/120, 725/127, 95; 707/100
See application file for complete search history.

(56) References Cited

U.S. PATENT DOCUMENTS

| 5,781,227 | A | * | 7/1998 | Goode et al. ..................... 725/32 |
| 6,154,772 | A | * | 11/2000 | Dunn et al. ................... 725/114 |
| 6,181,711 | B1 | | 1/2001 | Zhang et al. |
| 6,272,151 | B1 | | 8/2001 | Gupta et al. |
| 6,434,562 | B1 | * | 8/2002 | Pennywitt et al. ..................... 1/1 |
| 6,571,344 | B1 | * | 5/2003 | Sitnik ........................... 713/502 |
| 6,728,965 | B1 | * | 4/2004 | Mao ............................... 725/38 |
| 6,745,392 | B1 | * | 6/2004 | Basawapatna et al. ........ 725/120 |
| 6,757,796 | B1 | * | 6/2004 | Hofmann ...................... 711/159 |
| 6,763,019 | B2 | * | 7/2004 | Mehta et al. .................. 370/352 |
| 6,857,132 | B1 | * | 2/2005 | Rakib et al. .................... 725/114 |
| 7,203,953 | B2 | * | 4/2007 | Mao et al. ..................... 725/109 |
| 7,451,475 | B1 | * | 11/2008 | Oz et al. ......................... 725/127 |
| 2002/0048275 | A1 | * | 4/2002 | Atwater et al. ............... 370/409 |
| 2002/0059274 | A1 | * | 5/2002 | Hartsell et al. ............... 707/100 |
| 2004/0034863 | A1 | * | 2/2004 | Barrett et al. ................... 725/38 |
| 2005/0028206 | A1 | * | 2/2005 | Cameron et al. ................ 725/46 |
| 2006/0080707 | A1 | * | 4/2006 | Laksono ......................... 725/38 |

OTHER PUBLICATIONS

EPO Search Report, 03 708 307.8, Nov. 25, 2005.
Canadian Office Action for Application No. 2,473,475 dated Aug. 23, 2011 (2 pages).

* cited by examiner

*Primary Examiner* — Joseph P Hirl
*Assistant Examiner* — Jivka Rabovianski
(74) *Attorney, Agent, or Firm* — Fish & Richardson P.C.

(57) ABSTRACT

A media transmission system and method for the transmission of a desired one of a plurality of broadcast media channels to a remote client over a data connection is disclosed. The system includes means for routing data for a first one of the broadcast media channels over the data connection to the remote client and means for routing data for an alternate one of the channels over the data connection following receipt of a channel change request from a user; this allows efficient use of a limited bandwidth data connection.

18 Claims, 11 Drawing Sheets

MEDIA TRANSMISSION SYSTEM AND METHOD

The invention relates to a system for transmitting broadcast media services, particularly but not exclusively television services and finds particular but not exclusive application to transmitting services over data connections where bandwidth is at a premium or in limited supply and in one preferred form to DSL connections.

Television, once provided solely by conventional terrestrial analogue radio broadcast means, now enters the family home by a variety of means. Cable and satellite technologies have been applied to bring) an ever increasing number of channels to the household. With them has come an array of associated services such as dedicated broadband internet connections and the like. However, these services are not available in all areas and also come at a price.

Other data services such as DSL or xDSL links are more widely and cheaply available, however, the bandwidth of such connections is generally more restricted than over a cable link and this has previously constrained the range of services provided over DSL. With DSL (or similar bandwidth data connections) it becomes feasible to transmit broadcast quality real time media, such as television programmes over a data connection, which was not practically possible with lower volume connections.

For completeness, by way of background, "pull-type" (i.e. where each user essentially requests a data file) streaming media systems have been used to provide media over the Internet, primarily highly compressed low bit rate media (for example a small image compressed into a 56 kbit/s stream). However, such systems require appropriate user software to buffer received data and significant dedicated server resources to stream the data to each user and so such systems are not readily scalable nor ideally suited to provision of broadcast quality services (which may require of the order of at least 2-4 Mbit/s using typical compression) to large numbers of users even where large bandwidth data connections are available.

Practical broadcast implementations, such as digital cable television, rely on "push type" transmission where an MPEG or similar transport stream is continually broadcast containing all available channels and each receiver merely decodes the stream. However, with typical compression and bandwidth limitations, it is unlikely to be generally practicable to transmit as many "channels" or "programmes" of acceptable quality at any one time as are desired.

A subscriber selected pay-per-view service or video-on-demand channels can be carried in a DSL connection by configuring the connection to carry a specific data stream, but this requires the setting up of a specific session for the user to obtain data from a pre-stored file. With pay-per-view, where a relatively long programme (e.g. a film) is likely to be delivered after each configuration and in any event there are formalities to complete before delivery, the requirement for configuration of the connection before media delivery may be acceptable. However, the flexibility of conventional broadcast TV where multiple "live" channels are simultaneously delivered is not available. As well as being cumbersome for the user, if there are large numbers of users, the system places great demands on the server. Thus the viewer is unable to change between a range of broadcast channels as is possible with conventional broadcast television.

It is an object of the invention to overcome or ameliorate at least one of the disadvantages of the prior art or to provide a useful alternative.

Accordingly, in a first aspect the present invention provides a system for the transmission of a desired one of a plurality of broadcast media channels to a remote client over a data connection, said system including means for routing data for a first one of the broadcast media channels over said data connection to said client and means for routing data for an alternate one of said channels over the data connection following receipt of a channel change request from a user.

In a corresponding method aspect, the invention provides a method for the transmission of a desired one of a plurality of broadcast media channels to a remote client over a data connection, the method comprising routing data for a first one of the broadcast media channels over said data connection to said client and subsequently routing data for an alternate one of said channels over the data connection following receipt of a channel change request from a user.

Thus, in contrast to conventional broadcast systems in which all available channels are simultaneously broadcast to all users and the users select between them at the user premises, the data actually delivered over the data connection are changed in response to a channel change request; unlike a typical broadcast system in which a channel change request is acted upon by a set-top-box, the system receives the channel change request.

The present invention is particularly useful for limited bandwidth systems, such as DSL, but advantages may be obtained in systems with greater bandwidth. The invention is particularly applicable to networks in which users can be individually addressed by the broadcast system (particularly DSL networks).

In a preferred implementation, the system has first means (e.g. a data output device) for providing data for a plurality of channels substantially continually (while each channel is live) substantially independently of user requests for channels and second means (e.g. a switch) for routing the data which is responsive to user requests for channels. In this way, the outputting of multiple broadcast channels can be optimised (without being compromised by having to deal with individual user requests) and only the routing changed in response to user requests.

Advantageously, at least in preferred forms, the system includes a switched network for transmitting said plurality of channels.

In a preferred implementation, the system includes multicast means for transmitting data for a channel to a plurality of users. Most advantageously, the multicast means comprises a switch for routing data. A particularly preferred implementation uses an ATM (asynchronous transfer mode) switch to route the data.

A second aspect of the invention provides a method of transmitting one of a plurality of broadcast media channels over a data connection including the steps of:

transmitting a data stream including at least a first one of said plurality of channels but not including a specified second channel over said connection to a remote client as a first data stream having a fast composition;

receiving a request signal from said remote client requesting transmission of the specified second channel; and including the specified second channel in the data stream in place of a portion of the first composition of the data stream.

If, as will typically be the case with DSL connections using readily available compression techniques, the data stream only carries a single channel, the portion of the data stream replaced will normally be the first channel. However, if the data stream carries significant other data or is carrying a plurality of channels (less than the plurality of available broadcast channels), the portion replaced may be a portion other than the first channel (which the user was previously viewing). For example, if the data can, at least temporarily, carry two media channels, possibly at the expense of other data, transmission of the second channel may commence in place of other data and subsequently the first channel may be removed. Having two channels transmitted in parallel may facilitate switching between channels with minimum glitch.

According to another aspect of the invention there is provided a media delivery system comprising:

media output means for outputting simultaneously a plurality of broadcast media channels for delivery to a plurality of remote clients;

routing means for routing a selected one of the plurality of broadcast media channels via a data connection to a remote client;

control means for receiving a request signal from the remote client requesting transmission of an alternate one of said plurality of channels and for controlling the routing means to route the alternate channel via the data connection to that remote client.

In a practical implementation, the routing means will typically be arranged to route selected ones of the plurality of broadcast media channels via respective data connections to a plurality of remote clients. The routing means may comprise multiple switches and routers and will typically comprise a switched network which, in one preferred implementation may be an ATM network.

Advantageously, the control means is separate from the routing means. This allows the high volume data routing function not to be impaired by the more complicated logic which may be employed to recognise and validate multiple channel change requests. Furthermore, the routing means may advantageously comprise a "standard" network component, suited to routing high volume general purpose data, rather than a dedicated video switch, facilitating replacement or expansion. The routing means may be arranged to route (high volume) data in response to (simple) routing commands, preferably in accordance with a predetermined standard protocol. The routing means may advantageously comprise a switch, preferably a switch which supports multicast (i.e. where incoming data, preferably packet data, may be copied to multiple outputs) and in a preferred implementation is an ATM switch. The protocol may advantageously comprise SNMP. The control means may be arranged to receive client requests and to generate switching instructions to configure the router. The control means may include means for validating a channel change request, for example based on stored client channel permissions.

Also, the routing means is preferably separate from the data output means. This may enable the data output means to be optimised for reliable output of data comprising (preferably broadcast quality) media without requiring complex switching to be built in, whereas the routing means can be optimised for data switching.

According to yet another aspect of the invention, there is provided a switched network for use in the transmission of one of a plurality of broadcast media channels received from a remote server, to one of a plurality of remote clients via a data connection wherein the switched network includes a data switch for performing switching operations and a switch controller remote from but operatively connected with said switch for providing switching instructions thereto.

According to yet another aspect of the invention there is provided user viewing equipment for receiving one of a plurality of broadcast media channels over a data connection, the user equipment including receiving means for receiving one of said plurality of channels over said connection, means for receiving a user channel change request and transmission means for transmitting a request signal requesting transmission of an alternate one of said channels-over said connection.

According to a still further aspect of the invention, there is provided user equipment for receiving, from a switched network, one of a plurality of broadcast media channels over a data connection wherein upon activation, said user equipment interrogates said network to identify available network resources.

According to yet another aspect of the invention, there is provided user equipment for receiving, from a switched network; one of a plurality of broadcast media channels over a data connection wherein said user equipment is configured to transmit one or more items of internal status information to said network.

Preferably, said status information may include the results of an internal integrity test to determine any attempts to bypass built in security measures. Alternatively, the status information may include data regarding the channels or services being accessed by the user or other profiling information. This status information may be used, for example, to direct advertising or scheduling information of interest to the user or to compile ratings data amongst other things.

Another aspect of the invention provides a switching network for use in the transmission of one of a plurality of broadcast media channels, received from a remote server, to one of a plurality of remote clients having user equipment over a data connection, the switching network including:

connection means for initiating a data connection between said server and said one remote client on receipt of a connection request switching signal;

termination means for terminating an existing connection between said server and said one remote client on receipt of a connection termination switching signal; and receiving means for receiving switching signals from a switched network controller.

In another aspect of the invention, there is provided a switching network controller for use in a system for the transmission of one of a plurality of broadcast media channels, received from a remote server, to one of a plurality of remote clients having user equipment over a data connection, the switching network controller including:

receiving means for receiving a request signal from said one client requesting transmission of a desired one of said plurality of channels; and transmission means for transmitting switching signals to a switching network thereby to effect the transmission of said desired channel from said server to said client.

In the immediately preceding two aspects, by providing a switching network and switching network controller as separate entities, the controller can deal with requests from users, which may require complex logic and validation of user permissions but the switching network need deal only with switching signals, which may comprise simple switching instructions in a standard protocol (e.g. SNMP).

In another aspect of the invention there is provided user equipment for use in the reception of one of a plurality of broadcast media channels over a data connection wherein said equipment includes means for performing internal status checks and transmitting data over the data connection to a network component.

A further aspect provides a network component in a network arranged to deliver broadcast media channels to a plurality of users, each user being connected by a data connection and having a user premises device, the network component comprising means for receiving information sent from a plurality of user premises devices and means for making available data for a plurality of users.

A further aspect provides a switching network controller for use in a system for the transmission of one of a plurality of broadcast media channels to a remote client having user equipment over a data connection, the switching network controller including:

receiving means for receiving a request signal from the client requesting transmission of a desired one of said plurality of channels; and validation means for validating a channel change request.

The switching network controller may include means for signalling a possible security violation if the request is inconsistent with stored information relating to the configuration of the user equipment. In a preferred arrangement, both the user equipment and the controller validate channel change requests. If a request is received from the user equipment for a channel for which the user is not authorised which the user equipment should have blocked, this may indicate a possible security violation (e.g. a user "hacking" the user equipment). Having channel validation performed at both the user end and within the network may increase security and also reduce network load.

The invention extends independently to methods of operation corresponding to all apparatus aspects and to computer programs and computer program products embodying any method aspects or for use in any apparatus aspects. All preferred features of all aspects may be applied to other aspects or provided independently (in particular but without limitation preferred features of method aspects may be applied to apparatus aspects and vice versa).

A preferred embodiment of the invention will now be described, by way of example only, with reference to the accompanying figures, in which:

DETAILED DESCRIPTION OF THE INVENTION

Background

Figure 1:
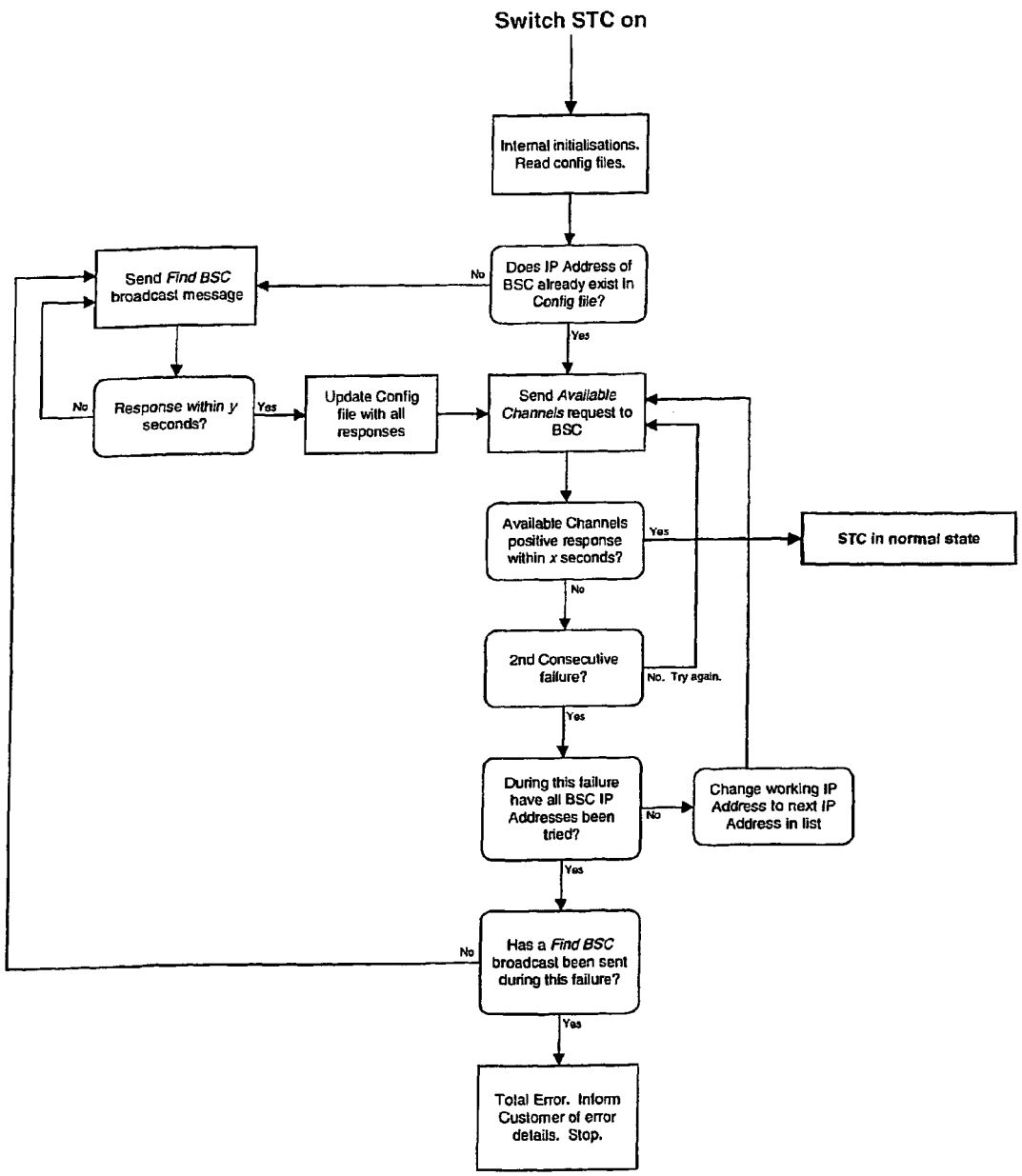
FIG. 1 is a flowchart illustrating the steps at STC Switch On/Initialisation/Available Channels Request.
Figure 2:
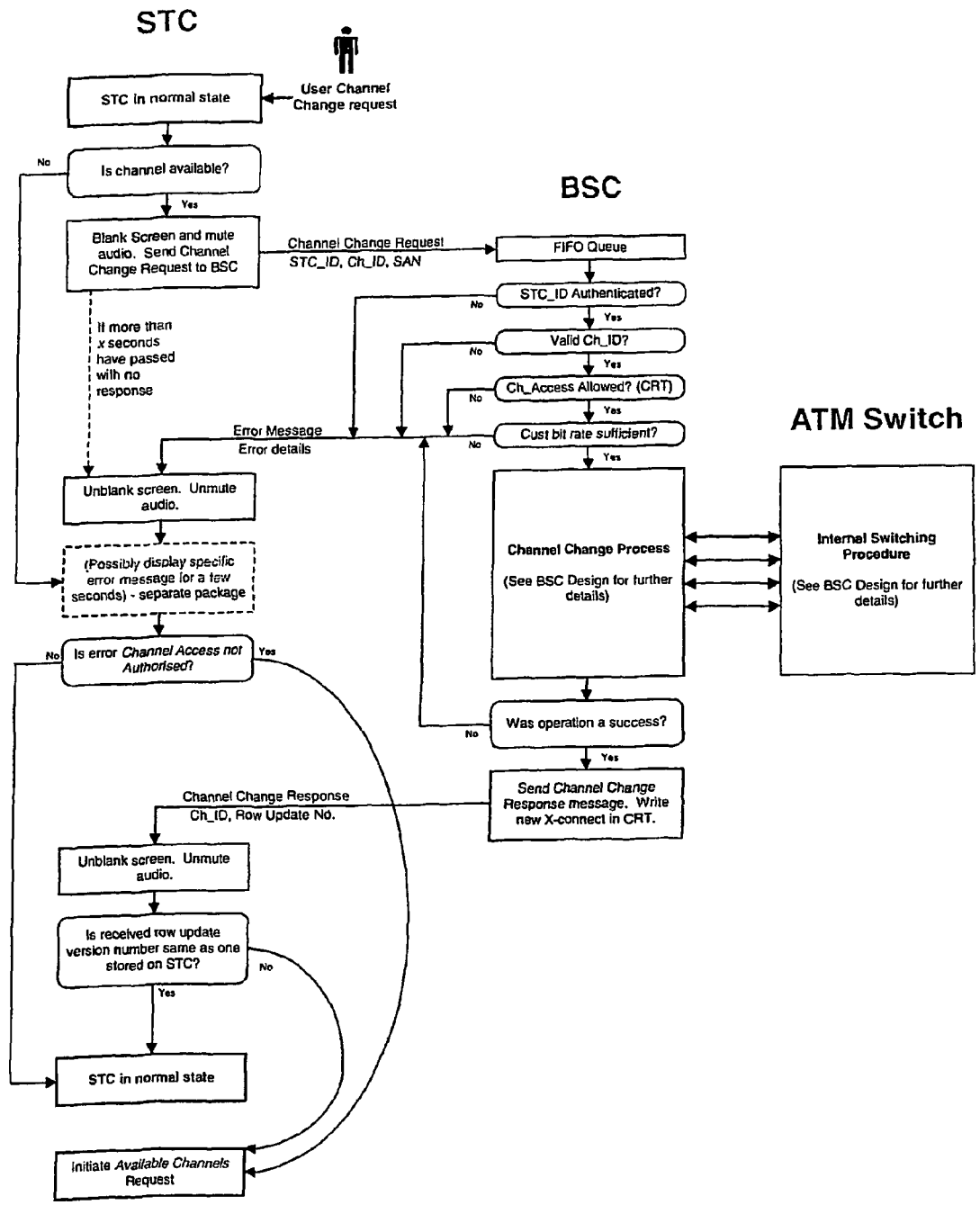
FIG. 2 is a flowchart illustrating the steps of an STC Change Channel Request.
Figure 3:
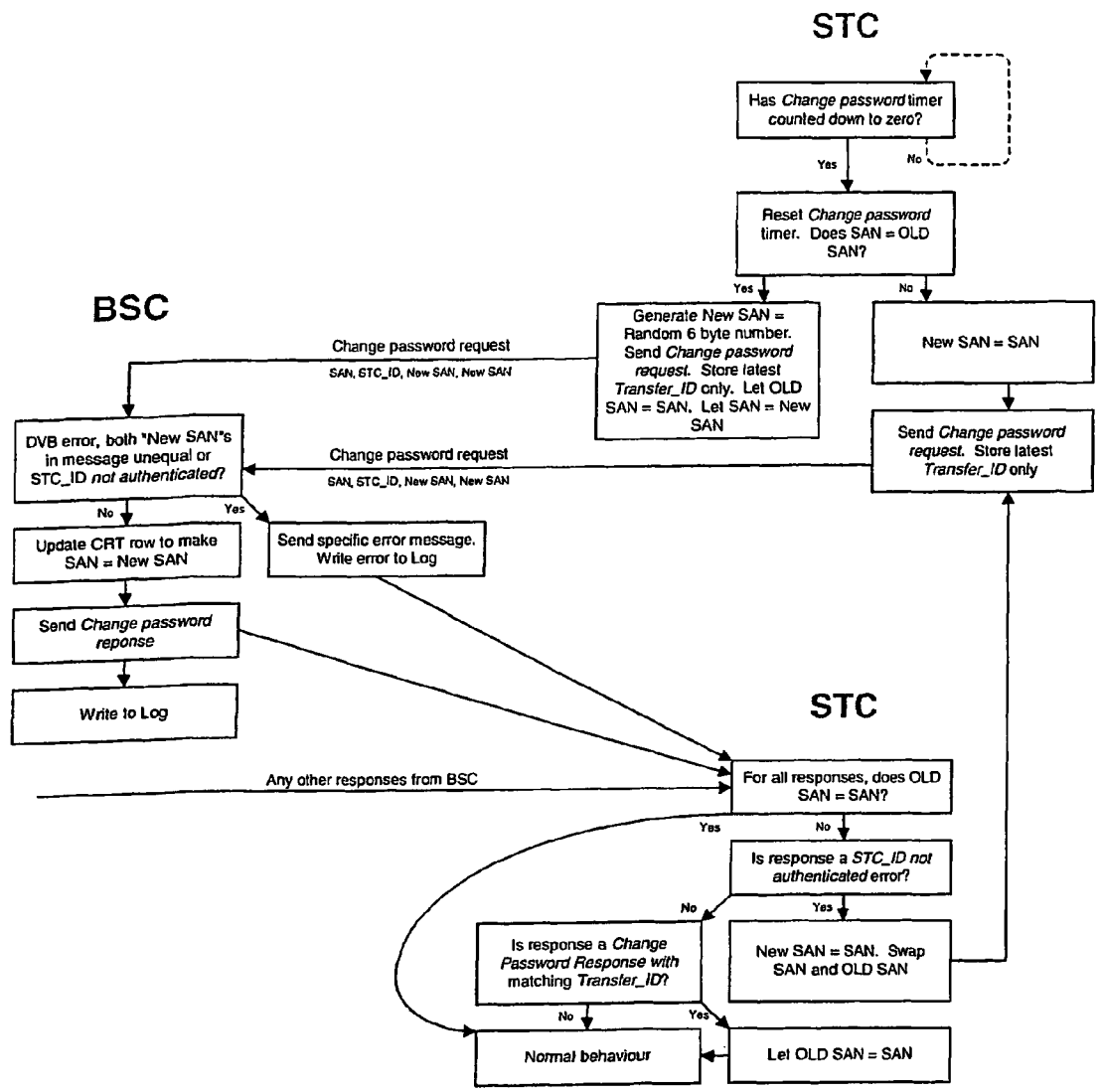
FIG. 3 is a flowchart illustrating the steps of a Change Password Request.
Figure 4:
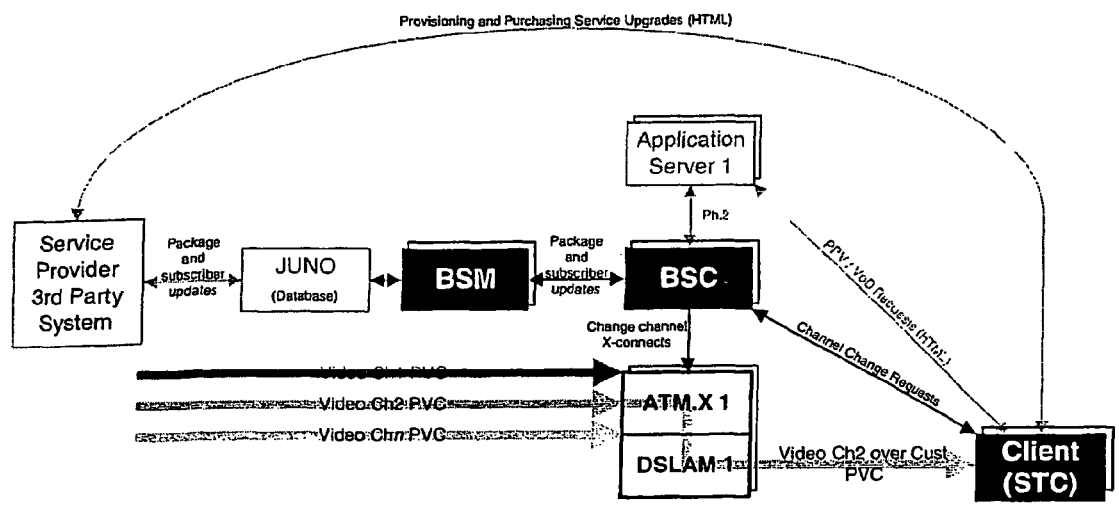
FIG. 4 is a schematic overview of the logical architecture of an embodiment.
Figure 5:
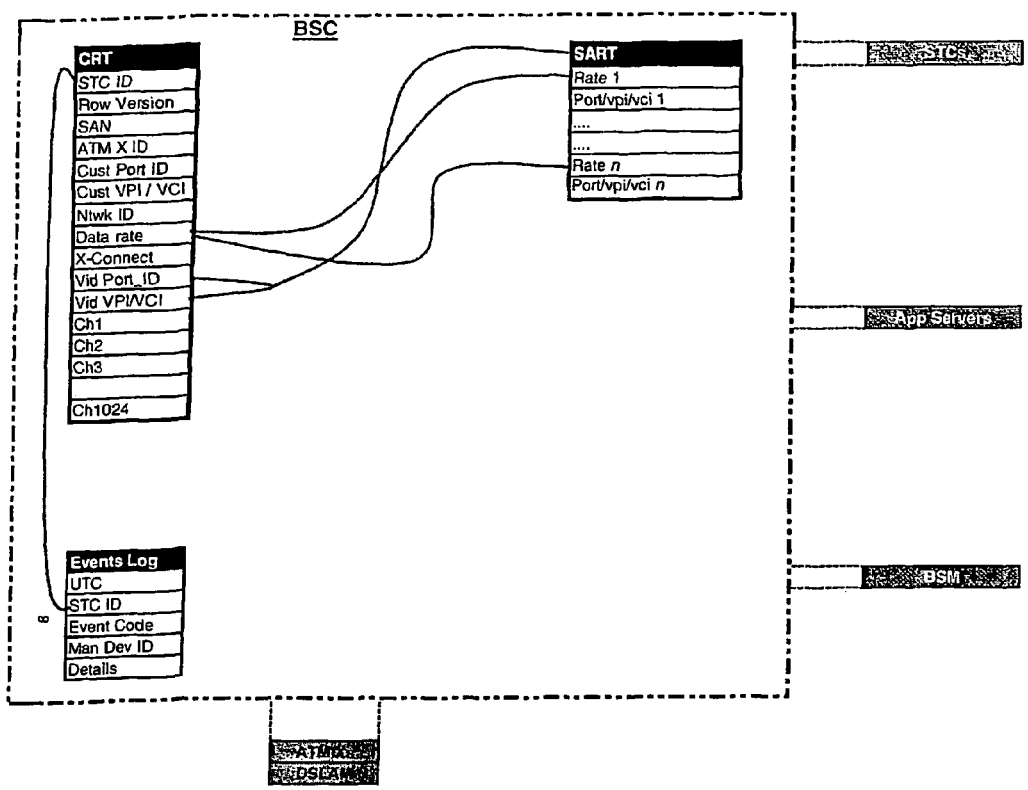
FIG. 5 is a schematic overview of Table Relationships
Figure 6:
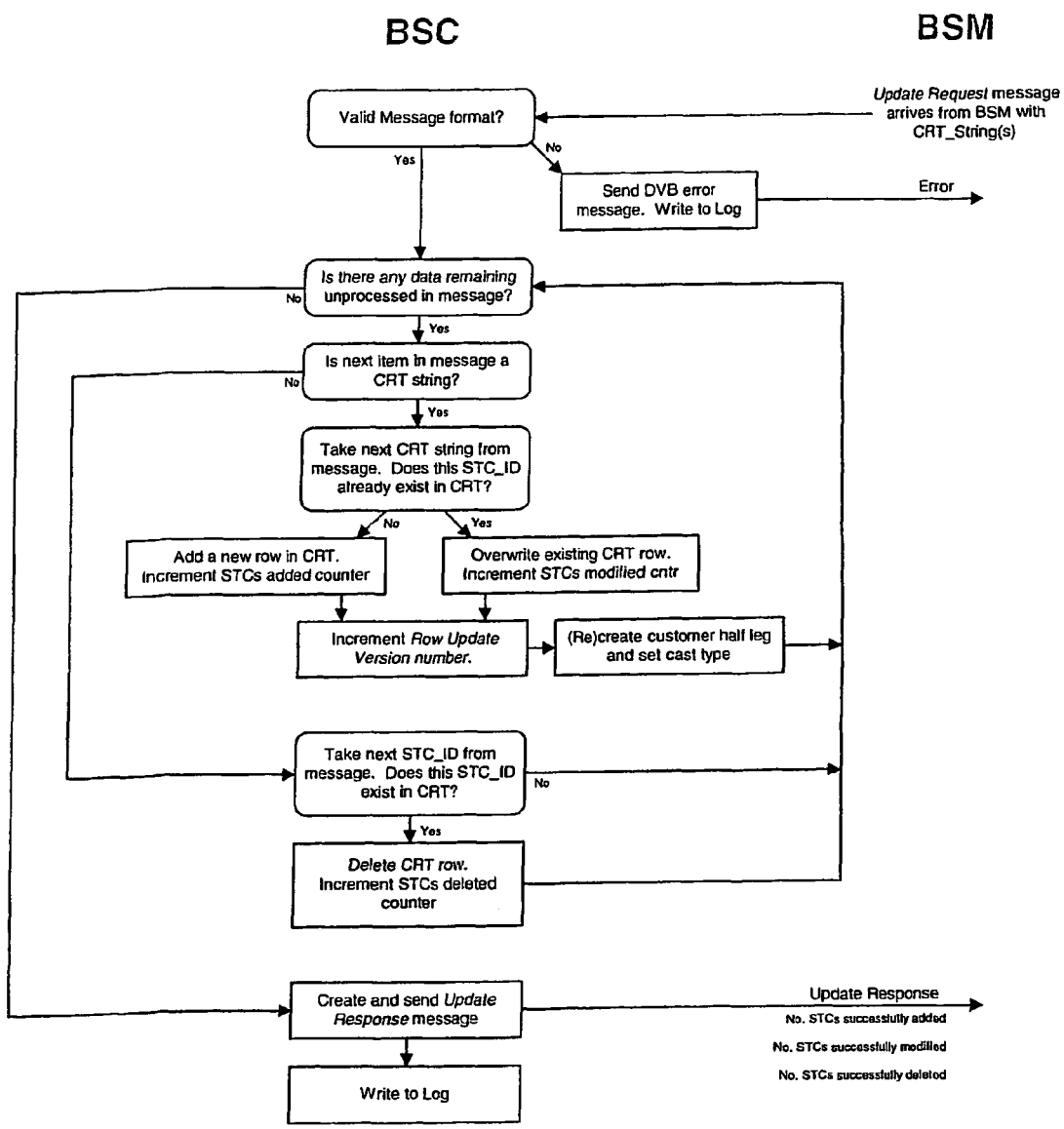
FIG. 6 is a flowchart illustrating the steps of Updating the Broadband Service Controller tables from the BSM.
Figure 7:
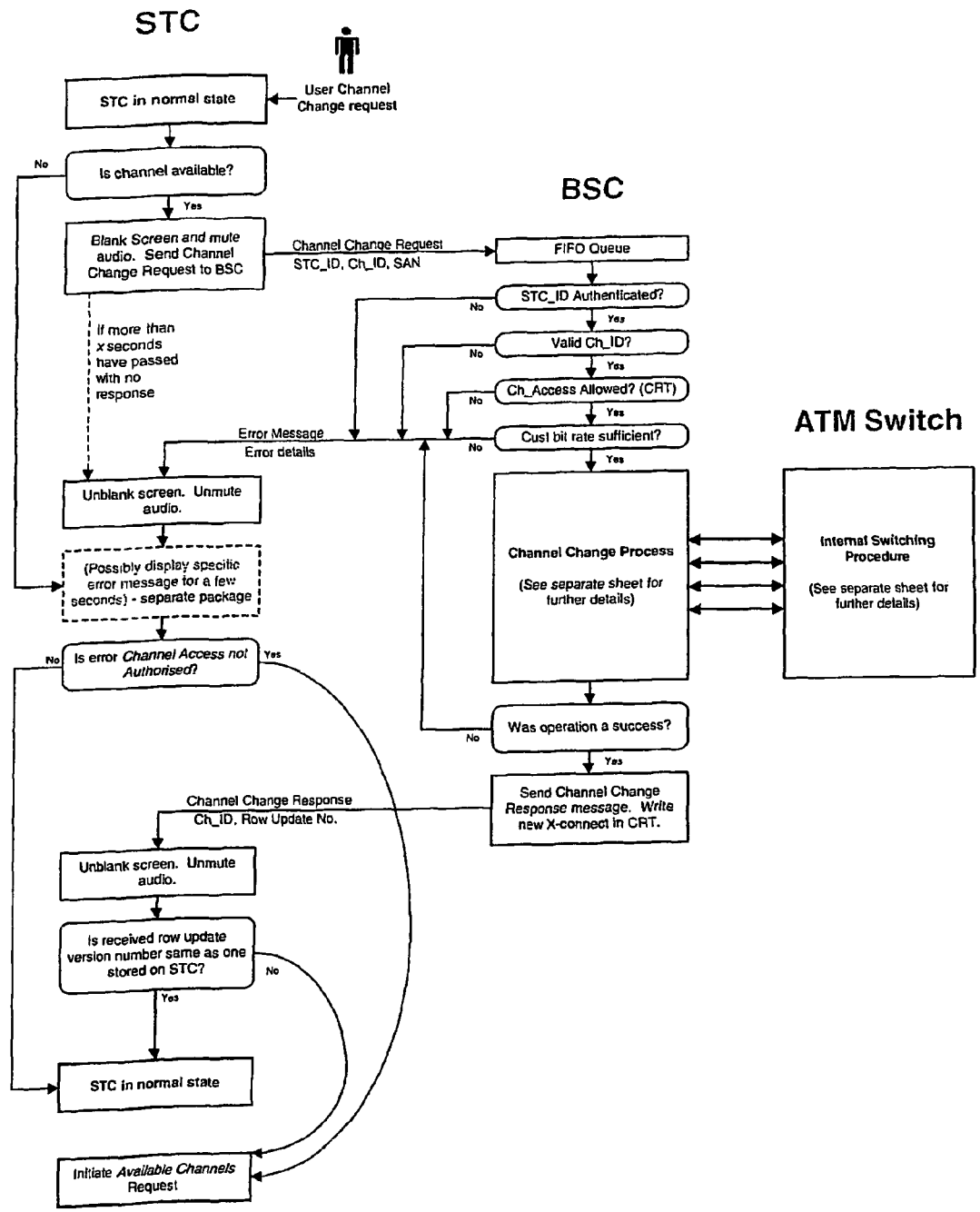
FIG. 7 is a flowchart illustrating in overview STC-Initiated Channel Change Requests.
Figure 8:
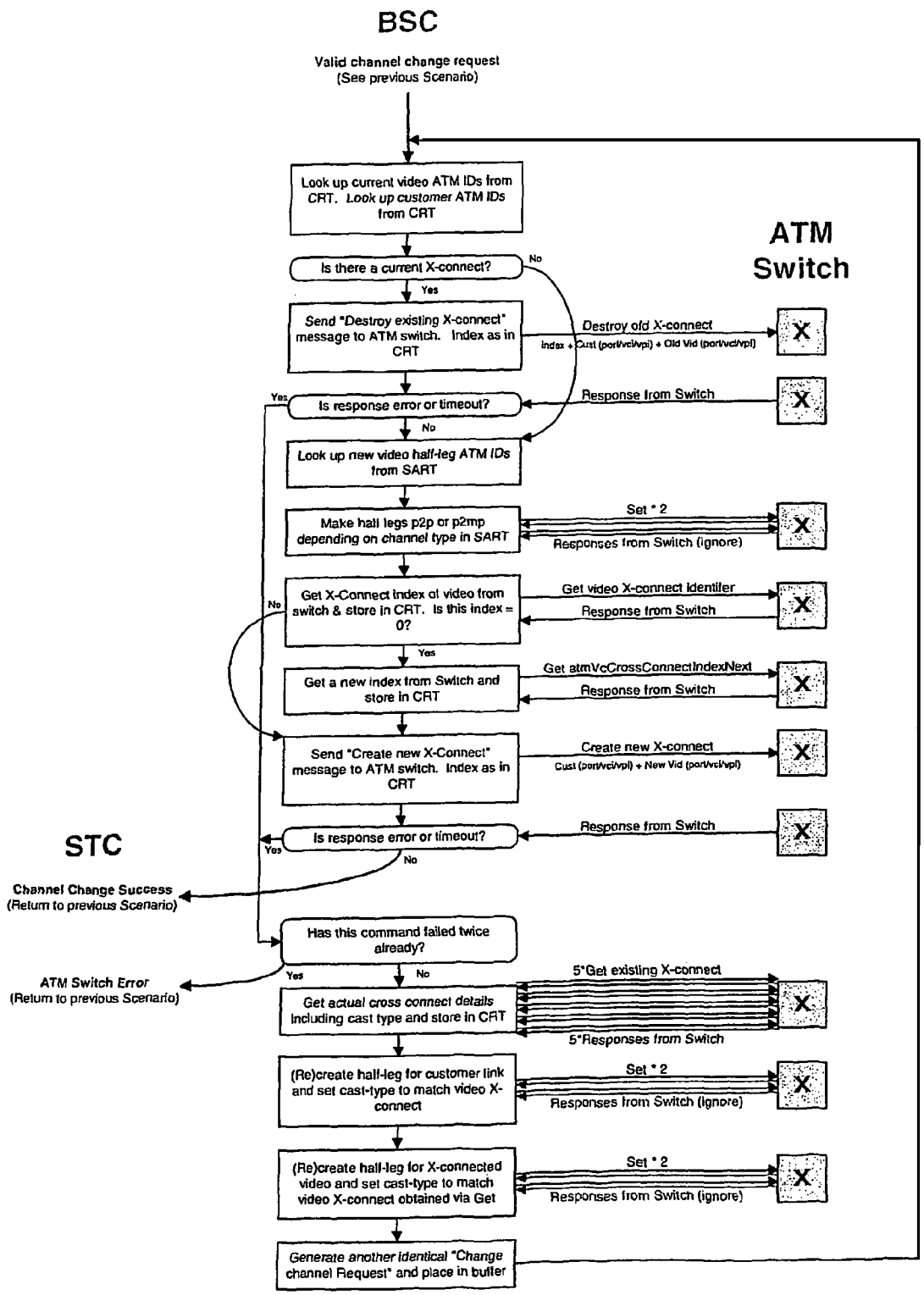
FIG. 8 is a flowchart illustrating an STC-Initiated Channel Change Requests highlighting ATM Switch Details and Errors.
Figure 9:
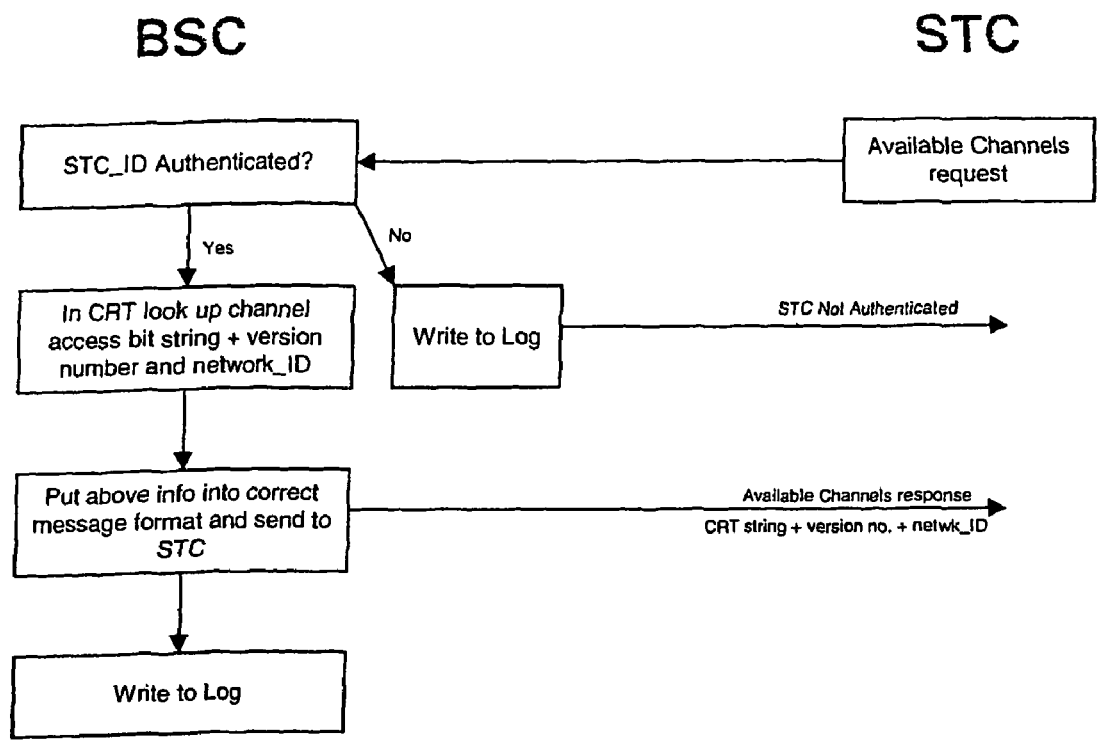
FIG. 9 is a flowchart schematically illustrating an STC Available Channels Request.
Figure 10:
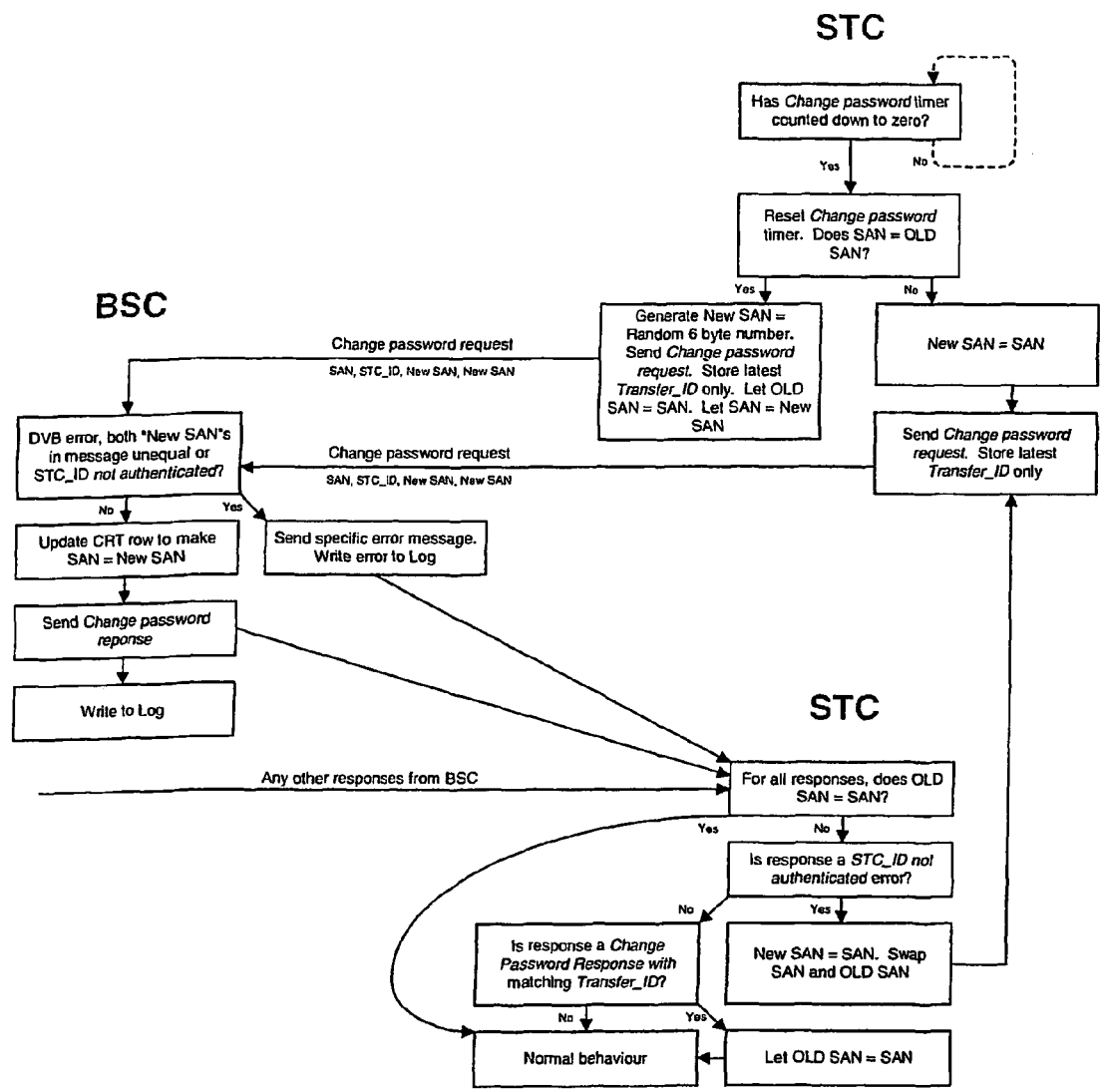
FIG. 10 is a flowchart illustrating a Change Password Request.
Figure 11:
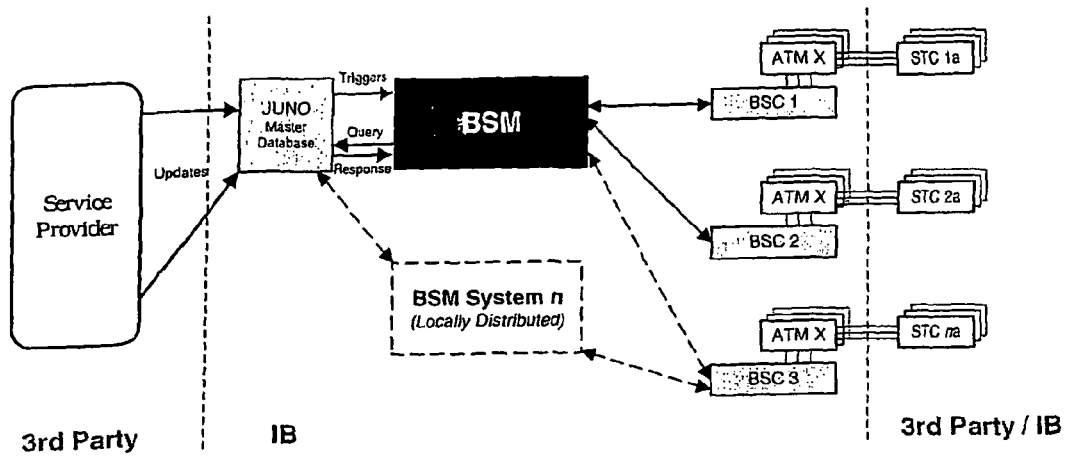
FIG. 11 schematically illustrates the logical architecture with particular reference to the BSM.

Referring to FIG. 1, the system includes a source of broadcast television programming; a plurality of set top computers (STC) located in respective users' homes and a switched network for creating and terminating connections as necessary between the broadcast source and each individual STC. Each STC is connected to the network by way of an xDSL data connection.

Data is preferably delivered between applications and the Set Top Computer (STC) in ATM cells. An advantageous component in xDSL delivery is a Digital Subscriber Line Access Multiplexer (DSLAM) which acts as an interface and multiplexer/demultiplexer between the various subscriber lines and the high speed data network concerned with service delivery. The DSLAMs are preferably located in telephone exchanges local to the customers. In preferred forms, the system is largely DSLAM vendor independent, with DSLAM specific operations implemented via a suite of interchangeable coding modules.

Using current xDSL technology and compression, there is only sufficient bandwidth available to the subscriber for the delivery of a single broadcast quality programme at any one time. Whereas over conventional cable systems, changing channels is a question of using DVB tables to tune to the correct frequency and to decode the relevant MPEG packets, over xDSL changing channels requires that the STC transmits a request to the service provider who then (after validation) sends the new stream to the subscriber. This channel changing function is managed by a Broadcast Service Controller or BSC. The Broadband Service Controller may also be employed in the process of authorising and delivering other services such as VoD and PPV.

STC Access to Broadcast Channels

Introduction

As described above, all channel change functionality for customers receiving video via the xDSL link is preferably performed centrally via the Broadband Service Controller. This service is most preferably available continually to all customers with no down time, preferably even if no channels are being broadcast or if customers are not eligible to receive channels.

STC Initiated Channel Change Requests

In offering a channel change service some customers may desire access to a basic suite of channels, whilst others will purchase additional programming. The STC is capable of monitoring the channels that each Subscriber is allowed to watch and will only allow channel change requests for those valid channels. Additionally, the Broadband Service Controller only provides customers access to channels which they are entitled to view, so rogue channel change requests from a hacked STC will not be authorised by the Broadband Service Controller. These access rights are preferably dynamic so additional services may be purchased at any time. Hence it is preferable that the Broadband Service Controller and the STC maintain an accurate record of customer access rights at all times.

Multiple Bit Rates

Due to geographical and physical considerations, the maximum bit rates available over the xDSL links vary from customer to customer, generally with those customers located nearer to their local exchanges able to receive higher data rates. To incorporate these differences the Broadband Service Controller is preferably capable of managing transmission of the same TV programmes to different customers at different bit rates or qualities. The STC then receives the channel at the highest broadcast rate available that is within the customer-purchased maximum bit rate ceiling.

Under some pricing models, a customer may choose to pay a lower amount and receive a lower bit rate service when their line is capable of receiving a higher rate. Accordingly, the quality made available to the customer is preferably determined by the quality of service purchased and not necessarily the maximum quality available over the line.

Link to the Broadband Service Manager (BSM)

The Broadband Service Controller contains a simple customer look-up table which relates to the permission status for each channel and the data rate available or purchased. These tables within the Broadband Service Controller are ideally kept current at all times, hence the Broadband Service Controller and the Service Provider's records (e.g. SMS etc.) should be synchronised. Rather than link Broadband Service Controllers directly to the Service Provider's database, preferred implementations involve communication to the Broadband Service Controller using a buffer system, known as the Broadband Service Manager (BSM). An advantage is that this allows a generic Broadband Service Controller to be developed, independent of the type of database employed by the Service Provider. The BSM is also able to prioritise updates so that Broadband Service Controllers are updated with the most time critical information first.

Access to Other Services (VoD, PPV etc.)

In addition to a range of broadcast programming, the xDSL platform is capable of providing a VoD service and PPV/NVoD opportunities similar to those currently offered over some HFC networks. Firstly the session is set up in the usual way via an application server, which has the additional responsibility of checking that the customer's line is fast enough to receive the chosen asset. The application server then instructs the Broadband Service Controller to switch the customer's channel to the service from the VoD or PPV channel. As a security measure, access to this type of service is only gained by this route and not directly from the STC. For VoD services, VCR type controls are preferably offered in the conventional manner via RTSP/DSM-CC commands to the VoD server.

Logging of Services Received at the Home

The Broadband Service Controller stores a complete record of all Broadband Service Controller transactions, including a complete list of all the channels that have been watched on every STC, including VoD and PPV events, referenced against time (to the nearest second) and date. In preferred embodiments, this log information is made available for off-line processing and use in various commercial applications such as market research or for data mining purposes.

General Functionality

System Performance

The delivered solution preferably offers customers a channel changing facility similar to that currently experienced over HFC networks or satellite—i.e. always available and reasonably fast. Glitches or errors may detract from the viewing experience and hence the delivered solution provided should be robust. Total channel change time as experienced by the Subscriber under peak Broadband Service Controller load should preferably not exceed 1 second. Given that it can take up to roughly 0.5 s to decode a new MPEG stream, an upper bound on the time between the customer pressing a button on their remote control and the channels to be switched in the AIM Switch of around 0.5 s is considered appropriate.

System Flexibility

Preferably, the delivered solution is written in a modular fashion, so that the core functionality is effectively equipment vendor independent, with any functions relating to specific equipment or communications protocols contained within an exchangeable block of code.

This modular format enables easy adoption of increased functionality developed in subsequent phases. It also allows the development of the same solution for a range of STC-Broadband Service Controller communications protocols, such as HTTP, RTSP and DVB and for various Broadband Service Controller-ATM switch protocols e.g. SNMP or Telnet etc.

Scalability

In preferred forms, the developed solution is easily scalable, so that working xDSL designs can be created simply for either a small town or nationally and beyond. This could involve scalable Broadband Service Controllers or multiple BSCs deployed at the same site.

Security

Generally, few customers will pay to be able to watch all channels and so the system must be secure to prevent customers from hacking into the system to watch channels for free that they have not paid for. Access to high value other services such as NVoD are preferably controlled centrally rather than via STC initiated requests. In addition, it is important that only the subscriber can change their own channel and not a remote hacker.

Redundancy

As it is essential that the Broadband Service Controller maintains a service to customers at all times, the implemented design should desirably allow for redundancy to exist. Redundancy should preferably also exist in the way that the BSCs are provisioned with data, via the BSM. The general principle is that the failure of any one system component will not result in the failure of the whole system. An advantageous feature of the system architecture disclosed herein is that redundancy is relatively easy to incorporate; for example multiple BSCs can be provided.

System Management

The delivered solution is preferably open to standard System Management packages, without compromising system security.

Data Model

Introduction

The Broadband Service Controller will hold and maintain a number of tables in memory. These tables are key in providing BSC functionality and it is crucial that they are kept up to date at all times. The structure of these tables is as follows:

Customer Reference Table (CRT)

Functional Overview

This table contains details of how to communicate with each STC and also details which channels (services) each STC is allowed to access at any given time.

Table Structure

| Customer Reference Table (CRT) | | | | | | |
|---|---|---|---|---|---|---|
| ID | Row Update | (SAN) - STC | Customer ATM Location | | | B' cast |
| STC ID | Version No. | Authentication No. | ATM X IP | Port ID | VPI/VCI | Ntwk ID |
| 3P2AB61035B1 | 03 | 000000000001 | 192.168.5.1 | 0001 | 00/0035 | 0004 |
| 3P2AB62012AA | 45 | 028000000001 | 192.168.5.2 | 0002 | 00/0277 | 0004 |
| 2FBB4100C9F0 | A3 | BC8F01467C55 | 192.168.5.2 | 0003 | 00/1A05 | 0013 |
| . | . | . | . | . | . | . |

-continued

| Customer Reference Table (CRT) | | | | | | | | | |
|---|---|---|---|---|---|---|---|---|---|
| . | . | . | . | . | . | . | . | . | . |
| . | . | . | . | . | . | . | . | . | . |
| FFFFFFFFFFFF | FF | FFFFFFFFFFFF | xxxx | | FFFF | 00/FFFF | | FFFF | |

| | | Current (SNMP) | Current Video ATM | | | | | |
|---|---|---|---|---|---|---|---|---|
| ID | Data Rate | X-Connect | | +VPI/ | Channel Access Rights | | | |
| STC ID | Purchased | Index | Port ID | VCI | Ch1 | Ch2 | Ch3 | Ch1024 |
| 3P2AB61035B1 | 3C | 3A5146 | 0020 | 00/0135 | 1 | 1 | 1 | . | 0 |
| 3P2AB62012AA | 28 | 2250B1CC | 0010 | 00/0149 | 1 | 1 | 1 | . | 1 |
| 2FBB4100C9F0 | 14 | 31A1DF00 | 0050 | 00/080A | 1 | 0 | 0 | . | 1 |
| . | . | . | . | . | . | . | . | . |
| . | . | . | . | . | . | . | . | . |
| . | . | . | . | . | . | . | . | . |
| FFFFFFFFFFFF | 28 | 7FFFFFFF | FFFF | FF/FFFF | 1 | 1 | 1 | . | 1 |

Table Description
STC ID—Unique reference for each STC (which could be the MAC address of the STC). This number is treated like an account number and is preferably different for every STC, even for two installed in the same household.
Row Update Version No.—This is a counter which is incremented by the Broadband Service Controller every time the entry is modified by the BSM for a given customer. Upon reaching 0xFF, a subsequent increment will return the counter to 0x00. This counter is used so that the STC can keep its internal data (e.g. channel access information) in synch with data held on central databases.
STC Authentication Number (SAN)—This field is use when authenticating all STC transactions and acts like a password.
ATM X IF—Each STC will access video services through a particular AIM Switch which will have its own unique IP address—as indicated in this table. This is unlikely to change once the system is set up.
Port ID—Relates to the physical port on the ATM switch which connects to the customer premises via the DSLAM and the local loop. Once the account is set up, this ID should not change.
VPI/VCI—(ATM terminology)—Gives the Virtual Path Identifier and Virtual Channel Identifier for each customer's VCL at their AIM Switch. Combined with the Port ID, these fields act like a data address for each customer on any given ATM Switch. Once the account is set up, these IDs should not change.
Broadcast Network ID—Allows customers to be placed on different virtual networks, which could be used to mirror terrestrial regional networks (e.g. Meridian, Granada, etc). This ID is used so that some channels (e.g. those of no local relevance) can be rendered "invisible" to customers when browsing though channel options.
Data Rate Purchased—This figure is the maximum useful data rate available for MPEG video over each customer's xDSL link, once any other transport overheads have been subtracted. This figure could change with time following on from network improvements or modifications local to the customer or if a variety of rates and prices are offered to the customer and the customer decides to opt for a different plan. This rate is necessarily lower than the max data rate values obtained by the DSLAM when setting up the xDSL link. The data rate purchased is used to compare with the broadcast rates as detailed in the SART (next section) to assess which version of an asset to connect to a customer. The data rate is measured in multiples of 100 kb/s.
Current X-Connect Index—Records the index of the current cross connect in the atmVcCrossConnectTable, between an incoming ATM video feed and an outgoing customer ATM link. Used to destroy the existing ATM cross connect, prior to creating a new one during a channel change operation. This index is preferably the same for all customers connected to the same p2mp video feed for any given ATM Switch. For p2p connections, this index is preferably unique for a given ATM Switch.
Current Port ID—Gives the port ID of the current service (channel) being watched at a specific bit rate. Used to destroy the existing ATM cross connect, prior to creating a new one during a channel change operation.
VPI/VCI—Gives the Virtual Path Identifier and Virtual Channel Identifier of the current service (channel) being watched at the current bit rate. Used to destroy the existing ATM cross connect, prior to creating a new one during a channel change operation.
Channel Access Rights—For each broadcast channel (1-1024) a single bit indicates whether the STC may access that channel (a "1" indicates access allowed, a "0" is access denied). The Broadband Service Controller must consult the channel access rights upon receiving all broadcast channel requests direct from the STCs, before proceeding with the channel change. Non broadcast channels such as NVoD and VoD are not listed in this table and are "invisible" to the STC, and can only be accessed via a channel change request from the appropriate application server. In this case the channel change request is not validated (apart from a check on bit rates) and is assumed to be correct.

Actual Structure of CRT Internal to BSC
This may be encoded in java. The CRT has the following internal structure:

| Byte | Description |
|---|---|
| 0 | Customer Port - lsb |
| 1 | Customer Port - msb |

-continued

| Byte | Description |
|------|-------------|
| 2 | Customer vpi |
| 3 | Customer vci - lsb |
| 4 | Customer vpi - smb |
| 5 | Network ID - lsb |
| 6 | Network ID - msb |
| 7 | Data Rate |
| 8 | Row Update Version No. |
| 9 | SAN - lsb |
| 10 | SAN |
| 11 | SAN |
| 12 | SAN |
| 13 | SAN |
| 14 | SAN - msb |
| 15 | Customer ATM Switch - lsb |
| 16 | Customer ATM Switch |
| 17 | Customer ATM Switch |
| 18 | Customer ATM Switch - msb |
| 19 | Channel Access Rights ch.1024-1017 |
| 20 | Channel Access Rights ch.1016-1009 |
| 21 | Channel Access Rights ch.1008-1001 |
| ... | ... |
| 145 | Channel Access Rights ch.0016-0009 |
| 146 | Channel Access Rights ch.0008-0001 |
| 147 | X-Connect index - lsb |
| 148 | X-Connect index |
| 149 | X-Connect index |
| 150 | X-Connect index - msb |
| 151 | X-connect vpi |
| 152 | X-connect vci - lsb |
| 153 | X-connect vci - msb |
| 154 | X-connect port - lsb |
| 155 | X-connect port - msb |

Service Availability Rates Table (SART)

Functional Overview

The system design allows for the same video service to be available at a number of different bit rates (1-n)—to suit different customer requirements/line limitations. This table acts as a map for every combination of Channel_ID and bit rate, the table giving the identity of the corresponding incoming video VC. Whilst the table structure allows for channels to be presented to the customer in n versions, usually just one version is preferably available. This is due to the cost of the extra encoding and transmission bandwidth required for each version of a given channel.

Table Structure

-continued

```
<name>BBC1</name> = the name of channel 1
<p2mp>yes</p2mp> = p2mp if "yes" or p2p if "no"
<atmx-list>
<192.168.6.21> = the IP address of the ATM X for this channel
<rates>
<24> = first instance of this channel at 24 * 100kb/s is found on
ATM switch as below
<port>1</port>
<vpi>5</vpi>
<vci>800</vci>
</24>
<48> = 2nd instance of this channel at 48 * 100kb/s is found on
ATM switch as below
<port>1</port>
<vpi>6</vpi>
<vci>800</vci>
</48> = end of 2nd instance of channel information, but indefinitely
extensible
</rates>
</192.168.6.21>
</atmx-list>
</1> = end of channel 0 information
<2> = start of channel 2 information
<name>RTM</name>
<p2mp>yes</p2mp>
<atmx-list>
<192.168.6.21>
<rates>
<28> = channel is available at 2.8Mb/s
<port>1</port>    = the port where channel 100 at rate 2.8Mb/s
is located
<vpi>5</vpi> = the vpi where channel 100 at rate 2.8Mb/s is located
<vci>802</vci> = the vci where channel 100 at rate 2.8Mb/s is located
</28>
</rates> = end of the channel rate information = channel 2 is only
available at a single rate
</192.168.6.21>
</atmx-list>
</2> = end of channel 2 information
etc.
```

Table Description

TV Chan. ID—The channel ID.

Rate 1—The lowest data rate at which the corresponding TV channel (service) is available. The unit of measurement of data rates is 100 kb/s—so e.g. a rate of 0x18 corresponds to 2.4 Mb/s.

Port/vpi/vci 1—The port, vpi and vci of the virtual circuit bringing the corresponding broadcast feed to the ATM

| Service Available Rates Table (SART) - all data in hexadecimal ||||||||
|---|---|---|---|---|---|---|---|
| TV Chan. ID | Rate 1 | Port/vpi/vci 1 | Rate 2 | Port/vpi/vci 2 | Rate 3 | Port/vpi/vci 3 | Rate 4 | Port/vpi/vci 4 |
| 001 | 18 | 0001/05/0320 | 30 | 0001/06/0320 | | | | |
| 002 | 1C | 0001/05/0322 | | | | | | |
| 003 | 14 | 0001/05/0324 | 26 | 0001/06/0324 | 30 | 0001/07/0326 | 40 | 0001/05/0380 |
| 3FF | 20 | 0001/05/0215 | 30 | 0001/05/0216 | 40 | 0001/05/022A | | |
| 400 (NVoD) | 1C | 0001/01/0030 | | | | | | |
| 500 (VoD) | 1C | 0001/09/0111 | 31 | 0001/0A/0112 | | | | |
| 501 (VoD) | 1F | 0001/05/0320 | | | | | | |

Note 1—Rates are arranged as follows: Rn>R3>R2>R1.

Note 2—The table is specified as an XML config file, e.g. as follows for the first three entries in the above table—(data in decimal):

```
<sarts> = link channels at specific bit rates to ATM locations
<channel>
<1> = start of channel 1 information
``` switch. Note that these could generally be the same/similar at each ATM switch involved in a given implementation, as broadcast feeds are generally distributed centrally via point to multipoint VCs over private networks. Also note that this solution allows 1024 separate services at up to n bit rates available per service. Hence the total number of broadcast TV. VCs required per switch could be much greater than 1024, exclusive of VoD/PPV etc.

Rate 2 etc—The next lowest data rate for the corresponding TV channel (service).

Broadband Service Controller Events Log

Functional Overview

This log file is used to record all Broadband Service Controller transactions for subsequent de-bugging and off-line analysis. Whenever STCs or servers communicate with the Broadband Service Controller, brief details are recorded here with an associated timestamp. This file is written to memory and is periodically copied to disk for subsequent off-line analysis. This is preferably performed every x events (configurable) stored in memory by a low priority background process. The following table lists all the events that can be stored in the events log and any associated details.

Event Codes & Associated Details

| Event Code | Name | Explanation and details required |
|---|---|---|
| 8201 | Channel change response | Details are the new Channel_ID |
| 8211 | Available channels response | No details required |
| 8221 | Change password response | No details required |
| 8101 | Update response | No. STCs not updated successfully |
| 8111 | BSC login response | BSM_ID |
| 82FF | Error | Details are the Error_ID |

Structure of Events Log

The following shows an example events log:

BSC Events Log

| UTC | STC ID | Man. Dev. ID | Event Code | Details | Explanation |
|---|---|---|---|---|---|
| 20013004 19:15:36.105 | F004591223FF | 0000 | 8201 | 0101 | Channel changed to 0101 |
| 20013004 19:15:39.776 | F0045912E100 | 150A | 8201 | 054C | Channel changed by svr 150A to 054C |
| 20013004 19:15:40.891 | 1300D5215522 | 0000 | 8211 | 0000 | Available channels response |
| 20013004 19:15:45.101 | C0C050002315 | 0000 | 82FF | A001 | Error (A001 = STC_ID unknown) |
| 20013004 19:15:46.426 | C0FD4000ABCE | 0000 | 8201 | 023A | Channel changed to 023A |
| 20013004 19:15:48.410 | 000000000000 | 0000 | 8101 | 0003 | Update response - 3 STC updates in error |
| 20013004 19:16:02.800 | 54A023611775 | 0000 | 8221 | 0000 | Change password response |
| etc. | etc. | etc. | etc. | etc. | etc. |

Table Description

UTC—Timestamp based on UTC down to one millisecond resolution

STC ID—Gives the D of the STC (if any) involved in the transaction. 0x00000000 indicates no STC involved.

Man. Dev. ID—Gives the ID of the managing device involved in the event. 0x0000 indicates that the event was managed by the STC itself. Other numbers represent application servers or other devices authorised to communicate with the Broadband Service Controller on behalf of the STC—this is to be implemented in future phases.

Event Code—This two byte code represents the type of event that is being recorded in the log (e.g. channel change request). Note that these event codes are the same as the DVB compliant message_IDs as used between system components and described elsewhere.

Details—Additional information related to the event code, e.g. for a channel change request, the desired channel ID. For further information see above events code list.

Broadband Service Controller Functions List

Introduction

The following section lists some of the main desirable features of the Broadband Service Controller functionality.

Further detail regarding the implementation of this functionality and how it is performed by the Broadband Service Controller is provided later. These Further illustration of these points is presented in the discussion on "Scenarios", where several standard Broadband Service Controller operations are explained.

The Broadband Service Controller is a simple, largely reactive device. In general, the Broadband Service Controller does not initiate any actions, but rather responds to incoming commands from other devices in the xDSL system. The three systems which can communicate with the Broadband Service Controller are (1) STCs, (2) The BSM and (3) Application Servers. The ATM switch is capable of communication with the Broadband Service Controller; these communications are not generally initiated by the ATM switch, but will generally be in response to a request from the Broadband Service Controller. These, in turn are typically in response to a request from one of the devices mentioned above. The commands which these devices can send to the Broadband Service Controller are listed below.

List of External Commands Handled by the Broadband Service Controller

STC Initiated Commands
    Channel change request
    Available channels request
    Change password request BSM Initiated Commands
    Update Request Application Server Initiated Commands
    Channel Change Request List of Actions Generated Internally by Broadband Service Controller
    Broadband Service Controller Socket Setup (=Login to BSM)
    Write Event Log to hard drive Broadband Service Controller—ATM Switch Communications Message Overview Introduction A key component in the channel changing process is the ATM switch. The ATM switch receives numerous video feeds over ATM Virtual Channel Links (VCL)s and connects ("cross connects") these feeds to the correct customer xDSL link, (via outgoing VCLs and the associated DSLAM links) using point to multipoint (p2mp) connections. Advantageously, p2mp enables more than one customer to watch the same channel at the same time. This duplication of data is done within the ATM switch (using features inbuilt, rather than requiring external components to duplicate the video streams). In the case of VoD, it is generally preferable to utilise point to point (p2p) connections instead.

Customer side VCLs will generally receive just one video feed at any one time due to xDSL bandwidth limitations— hence the ATM switch may be thought of as a patch panel for the incoming and outgoing VCLs.

The Broadband Service Controller preferably controls this "patching" function and is the sole agent responsible for ensuring that the correct video VCL is switched to the correct customer home. As the Broadband Service Controller and ATM switch are "always on", it is assumed that once the Broadband Service Controller has set a link within the ATM switch, that it will remain enabled until altered by the Broadband Service Controller at some future time. If, due to an error or crash, the Broadband Service Controller and the ATM switch get out of synchronisation—that is the cross connect made is not the same as the one in the Broadband Service Controller tables—then the ATM switch must be queried to discover its actual status. The state of the ATM switch can be either set or queried. For cross connects, the only information required in each message is as follows:

the identity of the customer VCL
the identity of the video VCL
whether the connection is to be made or terminated
the cross connect index in use/to use For reading from the ATM switch, the only information required is the customer VCL information. This is sufficient to discover the VCL identity of the video feed the customer is connected to.

In the following section the channel change process is explained in general terms and then following that, alternative protocols for performing this process are explored.

Channel Change Process

Introduction

Upon receiving a channel change request from a client, the Broadband Service Controller first performs a validation procedure. Assuming the channel change is valid, the Broadband Service Controller will then perform the following two stage process:

Destroy Existing Cross Connect

Firstly, the Broadband Service Controller uses its internal tables to look up the identity of the existing cross connect for the provided STC_ID. This is then used to prepare a suitably formatted message for the ATM switch (dependent on the protocol used) and then transmitted to the ATM switch, to destroy the existing cross connect. If there is no existing cross connect, this step is preferably bypassed.

Create New Cross Connect

The Broadband Service Controller will then use its internal tables (SART and CRT) to look up the VCL identity (port/vpi/vci) of the desired incoming video feed at an appropriate bit rate and will use this and the customer VCL information is used to prepare and transmit another message to the ATM switch, to create a new cross connect.

Confirmation of Process

The ATM switch returns an error if there has been a problem in reconfiguring the cross connects. If errors are returned from the switch during this process, the switch is queried to determine exactly which link was in fact created—so that it can be successfully destroyed and a new link made. As a part of this process, both the required ATM "half-legs" are also be (re)created, (if using SNMP). This error procedure provides for a useful fall-back option if for some reason the Broadband Service Controller and the actual state of the cross connects becomes unsynchronised.

Broadband Service Controller—Embodiment Using ATM Switch Using SNMP

SNMP for ATM Management

Messages are sent from the Broadband Service Controller to the ATM switch using the Simple Network Management Protocol (SNMP)—other protocols may be used. Using SNMP in ATM Management is described in RFC1695, "Definitions of Managed Objects for ATM Management Version 8.0. using SMIv2", To control and monitor devices using SNMP, access is gained via Management Information Objects or MIBs. Unfortunately it is not straightforward to create p2mp ATM cross connects solely by using standard MIBs, such as the ATM-MIB. The developed solution described here uses a proprietary MIB available on Cisco Systems' ATM switches, known as the CISCO-ATM-CONN-MIB. Hence this solution will only work with Cisco ATM switches. A corresponding solution should be implemented for switches from other manufacturers, based, on manufacturer supplied data.

SNMP Message Structure

To create/destroy cross connects between incoming (video feeds) and outgoing (to customer homes) VCLS, parameters must be set within the ATM switch. These parameters are preferably set using the SNMP "set" command. Multiple "set" commands can be sent to the switch at the same time, although to avoid complexity it is preferred in this embodiment to send only individual pairs of set commands in the same message per ATM link destroyed/created. The set command is formulated as follows:

Set (variable, value, type)—where the "variable" is defined by an Object Identifier (OID) which relates to the type of variable and the specific incidence (the cross connect index) of that variable, where "value" is the value that the variable should be set to and where "type" is the nature of the value, e.g. string, integer etc.

Initialisation Process

Before SNMP messages can be sent from the Broadband Service Controller to the ATM switch, the following steps should be taken:

1) Ensure the ATM switch has SNMP operations enabled.
2) The Broadband Service Controller must establish an SNMP peer known as an "agent" with the ATM switch. This is performed in the Broadband Service Controller application by providing the IP address of the ATM switch and a port number (0xA1 is a common default).
3) Public and private "communities" must be established with the switch.
4) Open a session with the switch. Once opened the session may be left open indefinitely.

Half-Leg Creation

A "half-leg" is part of an ATM PVC and can be thought of as terminating at the ATM switch until cross connected to another half-leg. In the implementation described here, half-legs will either be video VCCs arriving at the ATM switch or customer VCCs en route to customer homes (via the DSLAM). All these individual half-legs must be created on the switch for incoming and outgoing VCLs, before any cross connects can be made and destroyed. This is performed using the ATM-MIB with SNMP "Set" instructions such as the following:

snmpset 1.3.6.1.2.1.37.1.7.1.13.a.b.c integer 4 (creates a video half-leg)
where:
a=port no. of video channel
b=Vpi of video channel
c=Vci of video channel (available from SART)
snmpset 1.3.6.1.2.1.37.1.7.1.13.d.e.f integer 4 (creates subscriber half-leg)
where:
d=port no. of subscriber
e=Vpi of subscriber
f=Vci of subscriber (available from CRT)

By default, half-legs created in this way are point to point (p2p) not point to multipoint (p2mp). Before p2mp cross connects can be created, the half-legs must be changed so that the video half-legs are p2mp "root"s and the subscriber half-legs are then p2mp "leaf"s. For Cisco Systems' ATM switches only, this is performed via the CISCO-ATM-CONN-MIB as follows:
snmpset 1.3.6.1.4.1.9.10.13.1.2.1.1.1.a.b.c integer 2 (set video half-leg to p2mp root)
snmpset 1.3.6.1.4.1.9.10.13.1.2.1.1.1.d.e.f integer 3 (set subscriber half-leg to p2mp leaf)

Creating and Destroying Point to Multipoint Cross Connects

To create and destroy p2mp cross connects, SNMP messages are preferably sent to the "Virtual Channel Cross Connect Group" within the ATM-MIB, resident on the STM switch. Rather than use the stepwise procedures for setting up a VC cross connect, the VC cross connections are preferably established via the one-shot method (which does not trap connection errors) as follows:
snmpset 1.3.6.1.2.1.37.1.11.1.13.$x_1$.d.e.f.a1.b1.c1 integer 6 (destroys existing cross connect to customer d.e.f. connected to video a1.b1.c1)
snmpset 1.3.6.1.2.1.37.1.11.1.13.$x_2$.d.e.f.a2.b2.c2 integer 4 (creates a new cross connect to customer d.e.f. connected to video a2.b2.c2)

Note—The "x" referred to in the above instructions is known as the "cross connect index". It is a seemingly random number in the range 1-$2^{031}$, which acts like a reference for the cross connect. All cross connects which come from the same root (i.e. customers watching the same channel at the same bit rate) will have the same value of this index in any given time. Cross connects to a different root must necessarily have a different value of this cross connect.

For a customer attempting to watch a channel where no one else is already connected, no value of "x" exists, and a new value should be obtained from the ATM switch by performing a "get" instruction on the "atmVcCrossConnectIndexNext" object (OID=1.3.6.1.2.1.37.1.10) in the ATM-MIB. This value will then be stored against that subscriber ID in the CRT for as long as the subscriber remains connected to that channel and this value of x will also be used if other subscriber(s) should wish to watch the same channel at the same bit rate at the same time. If all the subscribers disconnect from a given channel at a given bit rate, x will have no meaning and a new value will need to be chosen the next time a cross connect is made to that root.

To Get the Current State of the ATM Switch

It is possible that via an error the Broadband Service Controller does not know what video channel a customer is connected to. In this situation the cross connect cannot be destroyed and hence the customer cannot change channel. To prevent this situation from arising, whenever a destroy or create cross connect SNMP "set" instruction returns an error, firstly the associated subscriber half-leg is preferably (re)created and its cast-type (re)stated "leaf" or "p2p" for VoD, then the ATM switch is preferably read via an SNMP "get" instruction, so that all the details of the current cross connect can be read. The video half-leg details read in this get instruction will then be used to (re)create the video half-leg and (re)state its cast-type as "p2mp root" or "p2p" for VoD. The newly obtained details will then be used to destroy the actual existing cross connect and hence allow a new one to be made, thus allowing the subscriber to ultimately change channel. The SNMP commands for obtaining details of the video half-leg cross connected to a customer half-leg are as follows:
snmpget 1.3.6.1.4.1.9.10.13.1.2.1.1.15.d.e.f (port no. of incoming X-connected video VCC)
snmpget 1.3.6.1.4.1.9.10.13.1.2.1.1.16.d.e.f (vpi of incoming X-connected video VCC)
snmpget 1.3.6.1.4.1.9.10.13.1.2.1.1.17.d.e.f (vci of incoming X-connected video PVC)
to obtain the cross connect index of the video half leg:
snmpget 1.3.6.1.2.1.37.1.7.1.12.d.e.f Broadband Service Controller—ATM Switch Using Telnet (Cisco Only)

Introduction

Telnet may be used as an alternative to SNMP for Broadband Service Controller—ATM switch communications. Initial tests show that this is considerably slower in manipulating ATM switch parameters than via SNMP.

Procedure

To telnet into the switch, the following procedure should be followed, using automated command generation software:
Establish a connection and provide all necessary authentication (passwords)
Enter configuration mode
Destroy the previous cross connect via commands similar to the following example:
interface atm 0/0/2 (connection from this incoming port)
no atm pvc 1 35 cast-type p2mp-root interface atm 0/0/0 1 40 cast-type p2mp-leaf
Create the new cross connect via commands similar to the following example:
interface atm 0/0/2
atm pvc 1 55 cast-type p2mp-root interface atm 0/0/0 1 40 cast-type p2mp-leaf
This command creates a point to multipoint connection from 0/0/2 1155 to 0/0/0 1/40.

Note—all Broadcast TV cross connects made within the ATM switch are preferably of the point to multipoint variety, so that several subscribers can watch the same video feed simultaneously.

Note—If there is no activity for a while, the telnet connection to the switch may be dropped. To prevent this from happening the Broadband Service Controller sends a "heartbeat" signal of a carriage return (do nothing) every 30 s.

Thread Model

Introduction

The Broadband Service Controller software is preferably written via a number of "threads". Each thread is a separate process which runs independently of other threads. Using CPU time slicing, a number of threads can appear to run on the same system concurrently. Different threads are preferably responsible for different areas of the Broadband Service Controller functionality and information is preferably shared between threads when one thread is to take over a process from another.

This system of programming is advantageous in that it facilitates asynchronous operations, so that no single element of Broadband Service Controller work can delay the other tasks which the Broadband Service Controller has to perform. For example, channel change requests can be processed by the Broadband Service Controller whilst events from the Broadband Service Controller events log are being written to disk.

For maximum efficiency of overall operation, different threads can be assigned different priorities (=different ratios of CPU time). Initially this can be "High, Medium or Low", though a more graded solution could be developed to aid with tuning finished performance, following on from system testing. Threads which during their allocation of CPU time have nothing to do may "sleep" and allow another thread to effectively take over the CPU early.

Thread List

A preferred list of threads which may be advantageously included (the threads may be provided independently) is as follows:

| No. | Thread Name | Thread Description | Priority |
|---|---|---|---|
| T01 | Boot up | Upon switching on the Broadband Service Controller, this thread performs all initialisation processes required. It then runs in the background. Its purpose is to start all the other threads and then check on their progress to make sure none have crashed. If that is the case, this thread will attempt to re-start the crashed thread. | H then zero L |
| T03 | STC listener | This thread is responsible for listening for incoming STC requests and passing these to the STC Actioner thread. | H |
| T04 | AppS listener | This thread may be responsible for listening for incoming Application Server commands and will then pass these on for actioning - in simple implementations, this may be omitted. | M |
| T05 | BSM listener (updates) | This thread is responsible for listening for incoming BSM update requests and passing these to the BSM Actioner thread | M |
| T06 | STC Actioner | This thread takes requests received by the STC listener thread and places these in a queue, processing them one at a time on a FIFO basis. This thread also generates and sends responses to these requests. The thread does not wait for responses from the ATM switch but carries on with subsequent requests, dealing with ATM switch responses asynchronously. | H |
| T07 | BSM Actioner | This thread receives messages from the BSM listener threads and places these in a queue, processing them one at a time on a FIFO basis. This processing generally involves updates to the CRT table. This thread also generates and sends reponses to incoming BSM request. | L |
| T08 | ATM_Switch_comms | This thread handles communications with the ATM switch as directed by the STC Actioner thread. Error responses from the ATM switch are preferably passed back to the Actioner. | H |
| T09 | Events_Log_Manager | Maintains a record of all Broadband Service Controller transactions and periodically dumps this to a hard drive. | L |

The actions within each thread's functionality are detailed graphically in the "Scenarios" sections.

Link Between Broadband Service Controller Tables and Threads

Tables Accessed/Modifed by Threads

| Thread No. | CRT | SART | BSM Logins | Svr Logins | Events Log |
|---|---|---|---|---|---|
| T01 | W | W | R | . | . |
| T03 | . | . | . | . | . |
| T04 | . | . | . | . | . |
| T05 | . | . | . | . | . |
| T06 | R/W | R/W | R/W | R/W | . |
| T07 | W | . | . | . | . |
| T08 | . | . | . | . | . |
| T09 | . | . | . | . | W |

Broadband Service Controller Hardware and Software

Hardware

The Broadband Service Controller preferably runs on a dedicated server, such as an Ultra-10 or equivalent, depending on sizing.

Software

This may be implemented using any suitable platform, but open platforms are preferred and an advantageous implementation may use Solaris Operating System and Java e.g. JVM 1.3.

Further refinements and developments of the system may include the implementation of some of the following advantageous features:

Enable a Broadband Service Controller to obtain its Broadband Service Controller_ID from the BSM rather than having it in its config file.

Look more closely at errors returned from the ATM switch, or non-response errors. In the event that there are multiple ATM switches, implement fail-over and redundancy in this area.

Look at requiring passwords to access the ATM switch via SNMP. The basic implementation described will accept correctly formatted SNMP requests from any source—hence a hacker could change anybody's service to view any channel!

Broadband Service Controller redundancy options—at any site have at least one Broadband Service Controller redundant. This should ideally implement periodically copying data between each other/load-sharing/or populating each one separately from the BSM. This last option is performed already via the concept of the Broadband Service Controller Group. When operating with more than one Broadband Service Controller, the issue of SANs (passwords) and SAN changing will need to be looked at.

Communicate to an STC immediately that a relevant Update message arrives into the Broadband Service Controller, rather than waiting for the discrepancy in the Row Update Version Numbers to be picked up.

Optimise the channel change and error handling procedure between the Broadband Service Controller and the AIM switch.

Security
Introduction

The full xDSL solution when implemented is preferably a large distributed system and as such may be vulnerable to attack by hackers and disruptions to the service from other causes. Following on from a successful attack, access to subscription channels could possibly be given to a number of subscribers for free, which would involve a loss of revenue to the Service Provider. These threats can be minimised by those skilled in the art based on known security procedures although as always with security issues, there is a trade-off between increased security and increased system complexity. When implementing security options, it should be borne in mind that ideally, the Broadband Service Controllers should be as lightweight as possible so that the channel changing process is as fast and "crash-proof" as possible. For reasons which will be appreciated, it is preferable that for any particular implementation, an individual security solution is implemented rather than a standardised approach and so a model solution will not be described in further detail.

Summary of Functionality

The Broadband Service Controller comprises three principal components:

BSM—Primary role to ensure Broadband Service Controllers and Broadband Service Controller Clients always have up to date information.

Broadband Service Controller—Primary role is to change channels for STCs on the ATM switch.

Broadband Service Controller Clients—Primary role to act as interface to applications on the STC.

In addition to the above primary roles, additional functionality should preferably be implemented across the system:

Authentication—Positive identification of the client

Authorisation—Offering only purchased services to the client

Encryption—Ensuring that data transfers between components are secure against sniffing Integrity—Ensuring that system is robust against system communications outages Non-Repudiation Authentication It is preferable that prior to any transaction with a STC that the Broadband Service Controller is able to authenticate that the STC is really who it says it is. There are a number of options for this:

Unique Password Used with Each STC

Upon initial boot-up, the Broadband Service Controller Client creates a random 6 byte password (the SAN). All messages from the STC to the Broadband Service Controller are sent with this ID. The first time the Broadband Service Controller receives a message from a particular STC it notes the SAN used and stores it against that STC ID in the CRT. In all subsequent messages from the STC, the sent SAN must be verified against the locally stored SAN by the Broadband Service Controller before any subsequent processing of the request can be carried out. The STC is preferably configured to change its password on a regular basis.

Time Based Passwords and Public and Private Keys

This approach involves obtaining private and public key pairs for every STC. All messages from the STC are "signed" using the STC's private key. Authentication is proved if these messages can subsequently be decrypted by the Broadband Service Controller using that STC's public key. This process can be slow and complex however and a partial implementation used to authenticate "virtual sessions" may be sufficient.

Dedicated PVC from Each DSL Modem—Broadband Service Controller Direct

With this approach, a dedicated extra PVC is created per STC between the STC and the Broadband Service Controller direct. Once set up this would offer excellent security and authentication of sender and would be speedy to operate. This approach may be cumbersome to provision, though, and requires an ATM card on each Broadband Service Controller.

Verification Based on Dynamically Allocated IP Addresses

Initially the STC uses its "Command and Control" PVC to communicate with the CNR and obtain a leased IP address. As this is via a dedicated PVC this process offers authentication and is secure from sniffing. Then in each message sent from the STC to the Broadband Service Controller, the incoming IP Address is detected and used along with the STC ID (in this case the MAC address) for verification within the CRT. In most circumstances this is preferably verified and authentication is preferably fast and effective. As the IP allocation is only leased, from time to time (dependent on configuration) the DHCP server will allocate an STC a new IP address. When the STC sends this new IP address in a message to the Broadband Service Controller for the first time, the IP addresses of the incoming message and the one stored in the CRT will not match and the Broadband Service Controller will need to communicate with the DHCP server for an update. Authentication should then proceed, except in the event of an attempted hack, when the STC request is preferably rejected.

Authorisation

Authorisation is related to the handling of channel change requests. Basically Subscribers can only receive channels contained within packages which they have purchased. This process is handled by the Broadband Service Controller by referencing its internal CRT (table) and as an additional layer of security, the STC Broadband Service Controller Client is preferably written so that it will only allow channel change requests to channels to which it believes it has access. Obviously authentication is a pre-requisite to successful authorisation.

Encryption

Encryption of control messages is not thought to be necessary as one of the assumptions is that control messages cannot be sniffed. Encryption of content is a different matter and is not discussed here; known techniques and principles may be applied.

Integrity

This relates to successful transport of messages and error checking etc. In an implementation using UDP rather than TCP to send messages, this should be considered but in many cases it may be acceptable to assume that no problems are caused by a lack of integrity.

Standard Procedures

All errors etc are logged, so repeated errors etc. can be analysed to help detect possible fraud attempts Set Top Computer (STC)

Background

Unlike the BSC and BSM described previously (which are normally always on), the STCs are located in the homes of customers and may be turned on and off at will. Customers expect that whenever they turn their STC on, that within a very short period it will offer full functionality, as if it had never been turned off. Hence any initialisation and login procedures must be completed quickly and must be extremely reliable.

Functional Overview

Boot-Up and Initialisation

Upon switching on, the STC hardware must first perform any internal initialisations as required.

Then a configuration file is preferably read by the STC, which contains various operational parameters. If the IP address read from this file is not valid or does not work or it is the first time the STC has been used, the client will attempt to obtain the IP address of the local BSC(s). This is performed by sending a 'Find BSC' broadcast message. Any BSCs that receive this message will reply with their IP address if the client is known to them. The BSC Client will then store the returned address(es) in its configuration file for future use.

Available Channels Request

When first switched on, or after having just received a message from the BSC containing an updated row version number, the STC will send an available channels request message to the BSC. Assuming an error free status, the BSC will respond with an available channels response message, which contains the latest Row_Update_Version Number, the Network_ID and the STC_Channel_List. The channel list represents current channel permissions for all broadcast channels (Channel_IDs 1-1024). This information is stored locally on the STC until updated.

The STC uses the channel access information and network ID when offering channels to the customer. The channel access string indicates all the channels which are within the packages which the customer has bought. The network ID may be used in conjunction with the SI spooler client (also running locally on the STC) to only display and allow access to regional channels within these packages that are specific to the customer's region (if the service provider wishes to offer this facility). The Network_ID is stored specific to each STC, as potentially customers on the same BSC but in a network border area could have different Network_IDs. Functionality associated with the Network_ID is not performed by the BSC client but is passed via the BSC to another application co-running on the STC platform.

Channel Availability Example

The Service Provider wishes to offer a regional programme to all its subscribers, specific to their region. There are four regions, North, South, East and West. These may correspond to four separate channels, say: 560, 561, 562, 563. The IDs for these channels are reserved on every ATM switch across the network, although usually only the relevant channel will actually be sent to each ATM switch, dependent on which region it is located in. All customers will have a "1" against channels 560, 561, 562 and 563 in their CRT entries in the BSC (as they are free channels). However the program guide application (separate package, also running on the STC) will use the network_ID and the SI to only show the relevant regional programme as an available channel and will "hide" the other regional channels from view.

This situation can be contrasted with where programmes are available on a national basis but are not within the packages purchased by the customer. In this case the STC will display information about these channels but will not allow access.

The following table summarises the situation:

| Type of Programme | Visible on Guide? | Accessible to Customer? |
|---|---|---|
| Ordinary basic package channel | Yes | Yes |
| Premium sports service | Yes | Depends if paid |
| Ordinary "North" region programmes | Only if in North region | If in North region |
| Premium "West" region programme | Only if in West region | If in West region and paid |

Channel Change Request

Channel Change Requests

At any time whilst the STC is switched on, the user may decide to change channels—in which case the BSC Client will send the BSC a change channel request, containing the STC_ID and the desired Channel_ID. STCs can only request channels in the range 1-1024 although not all of these channels are visible or available to the user. Only channels listed within the Network Information Table (NM) are visible to the user and of those, only the ones contained within packages which the user subscribes to can be selected as a channel change instruction. VoD or PPV channels will have channel numbers above 1024 and may only be requested via a successful session with the relevant application server (see separate document) and not via the BSC.

Between sending the channel change request and waiting for the response, the STC will blank the screen and mute the audio by calling standard APIs running on the STC. If no response has been received from the BSC within x seconds (configurable via a config file), the BSC will assume that it is still connected to the original channel and will unblank the screen and unmute the audio to resume with MPEG decoding. No further action is preferably taken and the responsibility will lie with the subscriber to initiate another change channel request.

Processing Channel Change Requests

Assuming the desired channel is authorised for viewing and the customer xDSL link is fast enough to receive the channel, the BSC will direct the ATM switch to connect the desired video feed to the customer and will return a confirmation message to the STC. In the event that channel access is denied, an error message is preferably returned to the STC. In either case this return message will also contain the Row_Update_Version_Number (see later). Upon receipt of this response from the BSC, the BSC client will un-blank the video and un-mute the audio.

STC Actions Relating to Row_Update_Version_Number

This variable is used so that the STC knows whether the information the client holds is completely up to date. This variable is returned in all communications with the BSC, including channel change requests. Once returned to the STC, if this variable is different from the one held locally, the STC will send the BSC an available channels request. This procedure is used to help limit unnecessary flows of information around the network.

An SI spooler client application is run locally on the STC. Whenever the STC receives updated information from the BSC, the STC sends the network_ID to the SI spooler client.

Client Authentication—SAN

To ensure that the BSC is able to verify that a message is received from a genuine STC client application, a system of client authentication is employed. This involves the use of the SAN (STC Authentication Number), which is used like a password. The SAN is a random number generated by the client and sent to the local BSC for storage. Subsequent messages are all sent with this SAN included and if this fails to match the SAN stored on the BSC, the request will not be authenticated and is preferably rejected.

To prevent an error permanently disabling a genuine STC client from accessing BSC services, via an intervention, the local BSC can be reset to accept whatever the next sent SAN is as the SAN for a given STC_ID.

Every y hours (configurable), the client will generate a new random password and will send this along with the current one in a Change password request message. Upon receiving this the BSC will update the locally stored SAN for the given STC_ID and will send a Change password response acknowledgement message.

BSM Functional Overview

Introduction

For the delivered system to work properly it is important that the individual Broadband Service Controllers maintain up to date records of customer and channel authorisation. When e.g. a new subscriber joins the system or an existing subscriber updates the details of their subscription, the Broadband Service Controller through which they access their video service should be swiftly updated to reflect these changes.

Each Broadband Service Controller maintains an internal table (the Customer Reference Table—CRT), which contains all the details required to perform the channel changing function on behalf of subscribers. The information required to populate all the individual Broadband Service Controller CRTs can be stored on a common master database. A preferred implementation of this, known as "JUNO", is provided by the applicant and detailed in separate documents.

Subscription changes and network changes affecting subscribers are initially handled by the Service Provider (via telephone calls or directly over the internet etc.), who will pass on all relevant details to the JUNO. Each Broadband Service Controller contains a local subset of some of the information held on the JUNO. The function of the BSM is keeping up to date all the Broadband Service Controllers that comprise the entire system with data held in the JUNO and so it is concerned with synchronising and prioritising passing relevant changes in data from the JUNO to the affected individual Broadband Service Controllers as efficiently as possible.

Overview of Specific Functions

Modifying Broadband Service Controller Data for a Single STC

Each BSM listens for incoming messages from the JUNO. These is preferably in the form of short messages which tell the BSM that the information held for a certain STC is out of date and an update is now due. Note that throughout this document, these messages are referred to as "trigger messages", as in database terminology a trigger is generated by the database in response to a change. Contained within the trigger message is the affected STC_ID and the nature of the change (add, modify or delete). The BSM places the received trigger messages on a buffer stack according to their type for subsequent processing and continues to listen for further triggers.

In parallel with this process, each BSM processes the trigger messages one at a time, according to their priority. For each trigger message the BSM sends a query to the JUNO, to retrieve the Broadband Service Controller_ID corresponding to the STC_ID and (for new or modified subscriptions), all the information required to create/update the CRT row entry on the local Broadband Service Controller. This update information is then transmitted to the relevant Broadband Service Controller and processed locally—whilst this is occurring, the BSM is free to process another trigger message from the buffer stack.

Note that this whole core process is similar, irrespective of the type of individual STC update (add, modify or delete subscriber).

Creating/Refreshing Broadband Service Controller Data for all STC Data

As well as individual subscriber updates from JUNO, there may also be a need to fill/refresh all the STC data contained on a Broadband Service Controller simultaneously. This may happen in the event of:

Broadband Service Controller login—A new Broadband Service Controller is connected to the system for the first time, or an existing Broadband Service Controller is recovering from a "crashed" state.

The "Batch Refresh" process is active and has determined that it is time to refresh the STC data held on a particular Broadband Service Controller. Batch updates are used to ensure that the whole system is kept up to date generally and are the mechanism by which global package alterations (made by the Service Provider) are communicated across the whole system. The refresh period and timing is preferably determined by the Service Provider and the system capacity but is preferably of the order of one complete refresh of every Broadband Service Controller every 24 hours.

Like individual STC updates, the updates to an entire Broadband Service Controller are also actioned via a system of trigger messages, though in this case the trigger messages are all created internally by the BSM and are not derived from triggers on a database. "Batch Refresh" trigger messages for each Broadband Service Controller are created periodically one at a time on a cyclical basis by an internal process. "Login" trigger messages are created by a dedicated listener process, whenever a Broadband Service Controller Socket Setup request is received.

Event Logging

All activities processed by the BSM are written to a log file, which is periodically dumped to the system's hard drive for subsequent storage.

General Design Requirements

System Performance

In general the amount of individual STC updates which the BSM will handle in a typical system is not expected to be high—probably not more than one event/customer/month. Hence the majority of the workload of the BSM will come from the batch refresh process. This process requires the requesting, receiving, re-transmission and acknowledgement of about 150 bytes of data (plus transmission overheads) per customer per update. System performance will vary greatly depending on the total number of subscribers covered by the BSM and the frequency of the batch refresh process.

Unlike channel switching as handled by the Broadband Service Controller, system delays related to BSM functions can generally be tolerated. This is due to the non-critical nature of the requests handled. A delay of several seconds in e.g. modifying customer subscriptions may not cause problems and delays in deleting former subscribers from the system are less critical still.

Updates to an entire Broadband Service Controller are also not time critical, although due to the large number of queries performed (one per STC_ID), these are carried out more efficiently via a single JUNO query and then passing this information to the Broadband Service Controller in long DVB messages (max is 64 kbytes per message).

System Flexibility

As for the Broadband Service Controller, the code for the BSM is preferably written in a modular format, to enable easy upgrades and communications modules for different devices and protocols to be developed.

Scalability

In a typical deployment, the BSM workload is not expected to be high nor time critical, hence could be managed by a small server. For very large applications (e.g., a national development), a number of BSMs and even JUNOs could be deployed.

Security

System security is important as a successful hack into the system could potentially offer free access to all broadcast channels (but not VoD or PPV etc) to a large group of people (e.g. all the customers attached to a single Broadband Service Controller). This should not be allowed to happen.

Redundancy

Each BSM system could be provided with a redundant system in a hot standby/load sharing capacity. Alternatively in a large-scale deployment a number of BSMs could be employed. As all the traffic to and from the BSMs is in the IP domain, if a single BSM failed, another BSM could temporarily take over the work load until the first BSM returned to service although in this case care would need to be taken with Broadband Service Controller IDs used in the Batch Refresh process.

System Management

The BSM should be designed to allow easy system management, without creating a security risk.

Data Model

The BSM does not maintain tables of data and does not process data. Its sole function is to manage the transfer of data from the JUNO to the Broadband Service Controllers—therefore no data model is required.

BSM Functional Description

Trigger Message Creation

Introduction

As described earlier, as soon as the details of a customer account are added/modified/deleted, this must be reflected in the tables of the Broadband Service Controller local to the customer. Also from time to time all the STC data contained on a given Broadband Service Controller should be refreshed. Each one of these processes will generate a trigger message, which is like a flag, telling the BSM that a JUNO query is outstanding. These trigger messages are stored in a queue on the BSM and are processed one at a time.

Triggers related to individual STC updates are generated internally by the JUNO database via an automatic process whenever there is a relevant update to specified tables. Changes to other JUNO data which do not affect Broadband Service Controller operation are essentially "invisible" to the BSM(s) and Broadband Service Controllers. Triggers then call a local stored procedure which formats a trigger message containing the update type and the affected STC_ID and are these are then sent to the relevant BSM. For details of this process see the document *Broadband Service Controller System Communications*. Each BSM maintains a "listener" which receives trigger messages and places these in the trigger message queue along with trigger messages already received from JUNO and trigger messages created internally for a whole BSC refresh.

Trigger Message Type 1—New STC

JUNO will generate a trigger whenever there is a new entry in its CPE table. A trigger message containing this trigger type and the STC_ID will then be sent to the BSM.

Trigger Message Type 2—STC Modified

JUNO will generate a trigger whenever one of the following changes occur to any STC_ID:

CPE table—any change

SUBSCRIPTION table—any change

For each change, a trigger message containing this trigger type and the STC_ID is preferably sent to the BSM. In the event of multiple simultaneous changes, multiple messages is preferably sent. It is the responsibility of the BSM to rationalise these into a single query, if more than one is currently outstanding for a single STC_ID (functionality to be designed and added in later phases).

Trigger Message Type 3—STC Deleted

JUNO will generate a trigger whenever an entry in the CPE table is removed. A trigger message containing this trigger type and the STC_ID will then be sent to the BSM.

Trigger Message Type 4—Broadband Service Controller Login

A listener within the BSM will generate a trigger message whenever it receives a BSC Socket Setup request. This trigger message will contain the Broadband Service Controller_ID and the trigger type and is preferably passed to the trigger message queue to join those already present to wait for processing.

Trigger Message Type 5—Batch Refresh

This internal BSM process will periodically generate trigger messages for a whole BSC refresh. Basically it acts like a very slow spooler and will produce one trigger per BSC once per refresh period (typically of the order of 24 h). These trigger messages can either be spaced out evenly (typically in the early hours of the morning) or could be specifically timed to coincide with periods of reduced network traffic and TV usage. Each trigger message from the batch refresh process will generate a trigger message containing the trigger type and the Broadband Service Controller_ID and is preferably passed to the trigger message queue to join those already present to wait for processing.

Note—In terms of processing the only difference between trigger message types 4 and 5 is that type 4 is allocated a higher priority than type 5.

Trigger Message Processing

Trigger Message Queuing and Prioritisation

The BSM can typically only process one trigger message and associated JUNO query at a time and so implements a queuing system for trigger messages which arrive whilst processing another query. As well as acting as a buffer, this system is also able to prioritise trigger messages, so that more urgent queries are dealt with before less critical ones, even if they arrive later.

The BSM will implement 3 FIFO buffers for trigger messages, the buffers having priorities, low, medium and high. When a trigger message arrives at the BSM it is placed on one of these buffers depending on its type and waits its turn.

Trigger messages are processed one at a time and then removed from their stack. Any trigger messages waiting for processing are preferably processed according to their relative priorities. ie medium priority trigger messages will always be processed before low priority trigger messages, high priority trigger messages will always be processed before medium priority trigger messages etc.

Query Generation

Once a trigger message is removed from the stack, the JUNO database must be queried to retrieve the latest information, before then passing this on to the Broadband Service Controller.

For each of the trigger message types except type 3—STC deleted, the core of each query is preferably the same. Basically the following information must be retrieved for each STC_ID queried:

Query CPE table for CPE_DSLMODEMDSLAMPORT
Query CPE table for NETWORK_ID
Obtain the maximum purchased bit rate by summing the bit rate of all the channels available. Note this could change so that a customer purchases a certain bit rate which is necessarily inside their maximum xDSL line capability.
Query SUBSCRIPTION table to obtain the PACKAGE_IDs subscribed to. Use these PACKAGE_IDs to query the DIGITAL SERVICE table to obtain a complete list of digital services subscribed to. Query the BTVSERVICETABLE for each DIGITAL-SERVICE_ID to obtain a complete list of all the BTVSERVICE_DVBSISERVICEID.s subscribed to.

In addition, for individual STC queries (trigger message types 1 and 2), the Broadband Service Controller_ID must also be queried and for whole Broadband Service Controller queries (trigger message types 4 and 5), the STC_ID of every STC controlled by the Broadband Service Controller must first be determined.

Queries can be written in SQL. The SQL generation is performed by the BSM.

Trigger Message Summary

This table summarises the trigger message types, priorities and the corresponding information that is queried from the JUNO.

complete refresh of every Broadband Service Controller every 24 hours. The reasons for this refresh are as follows:

1) Global Updates. Updates to the service offered by the Service Provider which will affect a large percentage of STCs simultaneously can be handled more efficiently via a batch process (than by millions of individual STC updates) and can be scheduled for times of lower network traffic. Such updates could be a re-allocation of network_IDs or global modifications to packages (e.g. Sports package 1 has Sky Sports 1 removed).

2) Resiliency. It is extremely important that the information held within the CRT is correct and up to date. If for whatever reason an individual STC update did not update its CRT row correctly, the batch refresh provides another mechanism for this to happen. Regular batch refreshes should help to ensure that errors are removed hopefully before they are detected by the Subscriber.

3) Security. Similar to the above, a regular refresh of the CRT data held within each Broadband Service Controller should help to make it more difficult for hackers to provide/gain unauthorised long term access to subscription services.

Batch Refresh Trigger Message Generation

The BSM will maintain in the batch refresh process a record of every Broadband Service Controller_ID that is "live" on the system, even if these are back-up controllers operating in a dual-redundant regime. Every time a new Broadband Service Controller is added to the system, its ID will also be added to the batch refresh process.

These Broadband Service Controller_IDs are preferably spooled out on a regular basis once every refresh process, to create type 5 trigger messages, which will then be queued and processed as described above. The spooling algorithm proposed is very simple. The batch refresh process will cycle through all the Broadband Service Controller_IDs live on the system, on at a time. New Broadband Service Controller_IDs added are preferably added onto the bottom of this list.

| | DB (JUNO) - BSM Trigger Message Summary | | | | |
|---|---|---|---|---|---|
| Type | Trigger Mssg Name | ID Assoc | Generated by | Priority | Info required from Master Database |
| 01 | New STC | STC_ID | Master Db | Medium | BSC_ID & CRT row for STC_ID |
| 02 | Modify STC | STC_ID | Master Db | High | BSC_ID & CRT row for STC_ID |
| 03 | Delete STC | STC_ID | Master Db | Low | BSC_ID |
| 04 | BSC Login | BSC_ID | BSM (BSC) | High | All STC_IDs & CRT row for each STC_ID |
| 05 | Batch refresh | BSC_ID | BSM | Medium | All STC_IDs & CRT row for each STC_ID |

JUNO Response Processing

Queries submitted to the JUNO database is preferably returned a short time later in a results set. This must then be translated or "parsed" by the BSM into the CRT string before transmission to the Broadband Service Controller.

This query response function is preferably performed by a separate agent within the BSM in parallel with: (a) trigger message listening (from JUNO), (b) trigger message generation (internal) and (c) update message transmission (to Broadband Service Controllers), so that once the BSM has received a complete response from the JUNO, it is free to process the next trigger message in the buffer.

Batch Refresh of an Entire Broadband Service Controller

Introduction

As described before, on a regular basis, each BSM will refresh all the data held within the CRT of each Broadband Service. Controller it manages in turn. This refresh period and timing is preferably determined by the Service Provider and the system capacity but is preferably of the order of one The time the batch refresh process is dormant between generating Broadband Service Controller ID refresh triggers=the total batch refresh period (e.g. 24 hours)/the number of live Broadband Service Controllers. The total batch refresh period is configurable.

More sophisticated systems could be developed to operate at times of lower network utilisation or lower TV demand.

Event Logging

Introduction

It is important for system analysis and fault handling that the processes within the BSM are logged. This log can be permanently stored for subsequent off-line processing and analysis. Events that are logged are preferably selectable from the full range of BSM operations. This is so that timing and performance can be investigated in detail during set-up, if necessary, but also so that events do not have to be logged needlessly if the system performance is good. There are currently 3 levels of logging, "Debug", "Test" and "Normal" which log a decreasing set of events.

Logging Procedure

It should preferably be possible to log all communications received and made by the BSM. The events log is written to BSM memory in the first instance but as a background process from time to time, the BSM will copy the events log onto the BSM hard drive and then clear down the events log memory for recording subsequent events.

Every item in the events log is time stamped with UTC to the nearest millisecond. A status byte is also logged indicating the progress of the events and any errors.

BSM-JUNO Communications

Introduction

The JUNO contains a large amount of information related to customer accounts of which only a small subset is required by the Broadband Service Controllers. As described above, whenever relevant changes occur in the JUNO, triggers are automatically created and sent as trigger messages to the BSM for subsequent processing. The BSM processes each trigger message type by querying the JUNO and then waiting for a response from JUNO before re-formatting and re-transmitting this on to the appropriate Broadband Service Controller. This section describes communications between the BSM and the JUNO.

Interface Principles

The communications design envisages two permanent channels between the BSM and the JUNO open the whole time. The first channel is for the sending of trigger messages from the JUNO to the BSM. The second channel operates in half duplex mode and is for the sending of queries and responses to and from JUNO. Hence whilst data transfer is underway, the JUNO is also free to send any trigger messages which are generated.

Trigger messages sent from the JUNO to each BSM are preferably sent using DVB compliant messaging over a TCP/IP socket connection.

JUNO queries and responses are preferably sent using SQL.

Message Overview

Messages relating to JUNO Generated Triggers

The trigger messages from the JUNO to the BSM will contain just two components, the trigger message type and the affected STC_ID. These are further described in the *Broadband Service Controller System Communications* document.

BSM Queries on JUNO

As summarised above, there are a total of five trigger messages which indicate that a JUNO query must be raised. As the BSM processes each new trigger message from the queue, it will generate an SQL query on the JUNO database. A short time later the JUNO response is preferably returned in a "results set". This must then be parsed to generate an exact copy of a CRT row, which will then be sent on to the relevant Broadband Service Controller as an update message.

BSM—Broadband Service Controller Communications

See separate document *Broadband Service Controller System Communications*.

Thread Model

Introduction

The BSM software is preferably written via a number of "Threads". Each thread is a separate process which runs independently of other threads. Using CPU time slicing, a number of threads can appear to run on the same system concurrently. Different threads are preferably responsible for different areas of the BSM functionality and information is preferably shared between threads when one thread is to take over a process from another.

This system of programming is advantageous in that it facilitates asynchronous operations, so that no single element of BSM work can delay the other tasks which the BSM has to perform. For example, adding a new subscriber to an Broadband Service Controller can be processed whilst events from the BSM events log are being written to disk. For maximum efficiency of overall operation, different threads can be assigned different priorities (=different ratios of CPU time). Initially this can be "High, Medium or Low", though a more graded solution could be developed to aid with tuning finished performance, following on from system testing.

Thread List

Typical threads which may be included (each may be provided independently, or in other combinations) comprise:

| No. | Thread Name | Thread Description | Priority |
|---|---|---|---|
| T00 | Boot_up | Performs any system initialisation and boot-up procedures required before self-terminating. | H then n/a |
| T01 | Monitor | This (optional) thread may monitor the status of all the other threads and attempt to re-start these if one encounters a problem. | L |
| T02 | Trigger_Message_Processor | Requests a trigger message from the trigger message queue object. Creates a related SQL query and queries the JUNO. Parses the results set and converts this to the CRT row format. Passes this data to the relevant CRT communicator thread. As part of the communications process, this thread maintains lists of which Broadband Service Controllers have connected and which are fully logged in. | H |
| T03 | Batch | Sleeps mostly. Wakes at intervals and in rotation puts a whole Broadband Service Controller update trigger message onto the trigger message queue, then returns to sleep. Also receives new Broadband Service Controller_IDs from any newly-created instances of thread T05 and adds these to its refresh list, rescheduling all subsequent refreshes accordingly. | L |

-continued

| No. | Thread Name | Thread Description | Priority |
|---|---|---|---|
| T04* | BSC_Login_Listener | Listens out for Broadband Service Controller "connect" requests. When receives one, communicates new Broadband Service Controller_ID to Trigger Processor (to add to its internal lists) and creates a dedicated CRT Communicator thread. Continues to listen. | M |
| T05-n* | BSC_Communicator | Handles the BSM - Broadband Service Controller communications and incorporates a large buffer so that T02 can dump batch data here and continue with next task. One thread per Broadband Service Controller with TCP/IP socket connection permanently open. As part of DVB communications, data transfers greater than 64 kBytes must be split into smaller messages to comply with the protocol. Each CRT communicator thread is initialised by the Login Listener and following receipt of a "Socket Setup" request, the instance of the CRT communicator thread also communicates its establishment to the Batch Refresh thread so that it can be included on its list and to the thread T02 to update its internal lists. | M |
| T06 | Events_Log_Manager | Maintains the record of all BSM transactions and periodically dumps this to hard drive every x messages. One log file is created every 24 hours. | L |
| T07* | Trigger_Listener | Listens out for "connect" requests from JUNO database. When receives one, creates an instance of the Trigger Communicator and continues to listen. If more than one JUNO database were in use or triggers could be sent via another route, more than one instance of the Trigger Communicator would be created. | H |
| T08* | Trigger_Communicator | Created by the Trigger_Listener thread. Responsible for receiving incoming trigger messages from the JUNO database and placing these on the trigger message queue. In normal operations, there would only be one instance of this thread. | M |

*these threads extend the DVB Connection Class within the IB developed, DVB Messaging Package.

Further Developments for Preferred Implementations

For trigger type 02, in the event that multiple trigger events occur simultaneously for the same STC, multiple triggers may be sent by the JUNO. In a preferred development the BSM may advantageously be arranged to identify this occurrence and use this information efficiently to create only a single query on the JUNO.

A monitoring thread (T01) may be provided to ensure the other system threads are functioning correctly. This should include removing any CRT communicator threads where the socket connection has closed and also removing this Broadband Service Controller_ID from the Batch thread and from the list of logged-in Broadband Service Controller_IDs used by the Processor thread.

A more sophisticated trigger priority system may be implemented, as required, or the priorities attributed to the distinct trigger types may be configurable via a config file.

If a subscriber is deleted on the JUNO and this delete message somehow is not received at the Broadband Service Controller, then this subscriber may never be deleted from their Broadband Service Controller. The Batch Refresh process may pick this up, by regularly mirroring the JUNO to Broadband Service Controllers but simple implementations may only be capable of adding or modifying subscriber entries. In preferred implementations a system of matching the number of subscribers sent during a batch refresh and the number of subscribers listed on the Broadband Service Controller should be implemented with any discrepancies reliably highlighted and removed.

A system of responding to JUNO for every trigger message sent could be implemented. At the moment, it is assumed that all trigger messages sent are received by the BSM. If this is not the case, changes are preferably picked up later by the batch refresh process.

The BSM should preferably verify that any attempted Broadband Service Controller connection is coming from an authorised source, before establishing a connection and sending out data.

General Considerations

Whilst the invention is described with reference to a particular embodiment, it will be appreciated by those skilled in the art that the invention may be embodied in many other forms. There are a number of components and sub components described. As will be understood, each of the components or sub components or features are novel and may be provided independently of other components, or with modified or different accompanying components, unless otherwise stated. Similarly, each of the preferred and sub features may be provided independently of other features, unless expressly stated to be linked. As but a single example, of what is intended by the foregoing, any of the sub features of a single component, e.g. the features of a single thread of a component such as a BSM or BSC may be provided independently or in a modified component or one which interacts differently with other components. Thus, in a different network architecture, for example, an ATM switch may not be used and many features may be omitted or modified but advantageous features may nonetheless be used. The invention extends to all sub features described herein unless specifically disclaimed or implicit from the context.

The invention claimed is:

1. A method for the transmission of a desired one of a plurality of broadcast media channels to a remote client over a network data connection, the method comprising:
    establishing a digital subscriber line (DSL) network data connection with the remote client, wherein the remote client comprises a set top computer;
    storing, in a customer reference table, an identifier identifying the remote client and an indication of a data transmission rate purchased by a customer for the remote client, from among multiple data transmission rates that are available for purchase for the remote client;
    storing, in a different, service availability rates table, multiple virtual channel identifiers for a particular broadcast media channel, each virtual channel identifier corresponding to a different virtual circuit that provides a broadcast feed of the particular broadcast media channel at a different network connection data transmission rate;
    receiving, from the remote client, a user-initiated channel change request to access the particular broadcast media channel;
    determining, in response to the channel change request, a maximum rate at which the broadcast feed for the particular broadcast media channel is to be provided based on the indication of the data transmission rate purchased for the remote client, stored in the customer reference table;
    selecting, from the service table, a particular virtual channel identifier corresponding to a particular virtual circuit that provides the broadcast feed of the particular broadcast media channel at a highest data transmission rate that is within the determined maximum rate; and
    causing the particular virtual circuit corresponding to the particular virtual channel identifier to provide the broadcast feed of the particular broadcast media channel at the highest data transmission rate that is within the determined maximum rate, over the DSL network data connection to the remote client.

2. The method of claim 1, wherein, before the user-initiated channel change request is received, the identifier identifying the remote client and the indication of the data transmission rate purchased for the remote client are stored in the customer reference table and the multiple virtual channel identifiers are stored in the service availability rates table.

3. The method of claim 2, wherein the data transmission rate purchased is less than a maximum available data transmission rate for the network data connection.

4. The method of claim 1, wherein the user-initiated channel change request does not reference the data transmission rate purchased by the customer for the remote client.

5. The method of claim 1, wherein causing the particular virtual circuit to provide the broadcast feed comprises creating a cross connection for the particular broadcast media channel using an asynchronous transfer mode (ATM) switch to transmit the broadcast feed of the particular broadcast media channel at the highest data transmission rate that is within the determined maximum rate.

6. The method of claim 5, further comprising destroying a cross connection for a current broadcast media channel to an ATM switch before creating the cross connection for the particular broadcast media channel.

7. A non-transitory computer storage medium encoded with a computer program, the program comprising instructions that when executed by one or more computers cause the one or more computers to perform operations comprising:
    establishing a digital subscriber line (DSL) network data connection with the remote client, wherein the remote client comprises a set top computer;
    storing, in a customer reference table, an identifier identifying the remote client and an indication of a data transmission rate purchased by a customer for the remote client, from among multiple data transmission rates that are available for purchase for the remote client;
    storing, in a different, service availability rates table, multiple virtual channel identifiers for a particular broadcast media channel, each virtual channel identifier corresponding to a different virtual circuit that provides a broadcast feed of the particular broadcast media channel at a different network connection data transmission rate;
    receiving, from the remote client, a user-initiated channel change request to access the particular broadcast media channel;
    determining, in response to the channel change request, a maximum rate at which the broadcast feed for the particular broadcast media channel is to be provided based on the indication of the data transmission rate purchased for the remote client, stored in the customer reference table;
    selecting, from the service table, a particular virtual channel identifier corresponding to a particular virtual circuit that provides the broadcast feed of the particular broadcast media channel at a highest data transmission rate that is within the determined maximum rate; and
    causing the particular virtual circuit corresponding to the particular virtual channel identifier to provide the broadcast feed of the particular broadcast media channel at the highest data transmission rate that is within the determined maximum rate, over the DSL network data connection to the remote client.

8. The computer storage medium of claim 7, wherein, before the user-initiated channel change request is received, the identifier identifying the remote client and the indication of the data transmission rate purchased for the remote client are stored in the customer reference table and the multiple virtual channel identifiers are stored in the service availability rates table.

9. The computer storage medium of claim 8, wherein the data transmission rate purchased is less than a maximum available data transmission rate for the network data connection.

10. The computer storage medium of claim 7, wherein the user-initiated channel change request does not reference the data transmission rate purchased by the customer for the remote client.

11. The computer storage medium of claim 7, wherein causing the particular virtual circuit to provide the broadcast feed comprises creating a cross connection for the particular broadcast media channel using an asynchronous transfer mode (ATM) switch to transmit the broadcast feed of the particular broadcast media channel at the highest data transmission rate that is within the determined maximum rate.

12. The computer storage medium of claim 11, wherein the operations further comprise destroying a cross connection for a current broadcast media channel to an ATM switch before creating the cross connection for the particular broadcast media channel.

13. A system comprising:
one or more computers; and
a non-transitory computer-readable medium coupled to the one or more computers having instructions stored thereon which, when executed by the one or more computers, cause the one or more computers to perform operations comprising:
establishing a digital subscriber line (DSL) network data connection with the remote client, wherein the remote client comprises a set top computer;
storing, in a customer reference table, an identifier identifying the remote client and an indication of a data transmission rate purchased by a customer for the remote client, from among multiple data transmission rates that are available for purchase for the remote client;
storing, in a different, service availability rates table, multiple virtual channel identifiers for a particular broadcast media channel, each virtual channel identifier corresponding to a different virtual circuit that provides a broadcast feed of the particular broadcast media channel at a different network connection data transmission rate;
receiving, from the remote client, a user-initiated channel change request to access the particular broadcast media channel;
determining, in response to the channel change request, a maximum rate at which the broadcast feed for the particular broadcast media channel is to be provided based on the indication of the data transmission rate purchased for the remote client, stored in the customer reference table;
selecting, from the service table, a particular virtual channel identifier corresponding to a particular virtual circuit that provides the broadcast feed of the particular broadcast media channel at a highest data transmission rate that is within the determined maximum rate; and
causing the particular virtual circuit corresponding to the particular virtual channel identifier to provide the broadcast feed of the particular broadcast media channel at the highest data transmission rate that is within the determined maximum rate, over the DSL network data connection to the remote client.

14. The system of claim 13, wherein, before the user-initiated channel change request is received, the identifier identifying the remote client and the indication of the data transmission rate purchased for the remote client are stored in the customer reference table and the multiple virtual channel identifiers are stored in the service availability rates table.

15. The system of claim 14, wherein the data transmission rate purchased is less than a maximum available data transmission rate for the network data connection.

16. The system of claim 13, wherein the user-initiated channel change request does not reference the data transmission rate purchased by the customer for the remote client.

17. The system of claim 13, wherein causing the particular virtual circuit to provide the broadcast feed comprises creating a cross connection for the particular broadcast media channel using an asynchronous transfer mode (ATM) switch to transmit the broadcast feed of the particular broadcast media channel at the highest data transmission rate that is within the determined maximum rate.

18. The system of claim 17, wherein the operations further comprise destroying a cross connection for a current broadcast media channel to an ATM switch before creating the cross connection for the particular broadcast media channel.

* * * * *

UNITED STATES PATENT AND TRADEMARK OFFICE
CERTIFICATE OF CORRECTION

PATENT NO. : 8,156,533 B2
APPLICATION NO. : 10/503418
DATED : April 10, 2012
INVENTOR(S) : Daniel Crichton Page 1 of 1

It is certified that error appears in the above-identified patent and that said Letters Patent is hereby corrected as shown below:

Title Page, Foreign Application Priority Data (30), Line 1, delete "0229053" and insert --02290253--, therefor.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,156,533 B2 | Page 1 of 1 |
| APPLICATION NO. | : 10/503418 | |
| DATED | : April 10, 2012 | |
| INVENTOR(S) | : Daniel Crichton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this
Twenty-eighth Day of August, 2012

David J. Kappos
*Director of the United States Patent and Trademark Office*